United States Patent
Nakayama

(10) Patent No.: US 9,599,837 B2
(45) Date of Patent: Mar. 21, 2017

(54) IMAGE BLUR CORRECTION DEVICE HAVING LENS ROTATION ALONG LINES CONNECTING A FULCRUM PORTION TO FIRST AND SECOND DRIVING PORTIONS

(71) Applicant: SONY CORPORATION, Tokyo (JP)

(72) Inventor: Tatsuyuki Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 210 days.

(21) Appl. No.: 14/447,914

(22) Filed: Jul. 31, 2014

(65) Prior Publication Data

US 2015/0043076 A1  Feb. 12, 2015

(30) Foreign Application Priority Data

Aug. 12, 2013  (JP) ................. 2013-167623

(51) Int. Cl.
    *G02B 27/00* (2006.01)
    *G02B 27/64* (2006.01)
    *H04N 5/232* (2006.01)

(52) U.S. Cl.
    CPC ....... *G02B 27/646* (2013.01); *H04N 5/23287* (2013.01); *G02B 27/0025* (2013.01); *G02B 27/64* (2013.01)

(58) Field of Classification Search
None
See application file for complete search history.

(56) References Cited

U.S. PATENT DOCUMENTS

| | | | | |
|---|---|---|---|---|
| 6,101,033 A | * | 8/2000 | Kuno | G02B 27/646 359/554 |
| 6,473,245 B1 | * | 10/2002 | Spinali | G02B 7/02 359/811 |
| 2007/0077052 A1 | * | 4/2007 | Chang | G02B 7/08 396/144 |
| 2010/0202766 A1 | * | 8/2010 | Takizawa | G03B 5/00 396/55 |
| 2011/0317060 A1 | * | 12/2011 | Nakayama | G02B 7/023 348/357 |

FOREIGN PATENT DOCUMENTS

JP      H07-274056 A    10/1995

* cited by examiner

*Primary Examiner* — Stephone B Allen
*Assistant Examiner* — Ryan S Dunning
(74) *Attorney, Agent, or Firm* — Chip Law Group

(57) ABSTRACT

An image blur correction device includes: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion so as to rotate the lens unit in the first direction; and a second actuator that has a second driving portion so as to rotate the lens unit in the second direction.

11 Claims, 40 Drawing Sheets

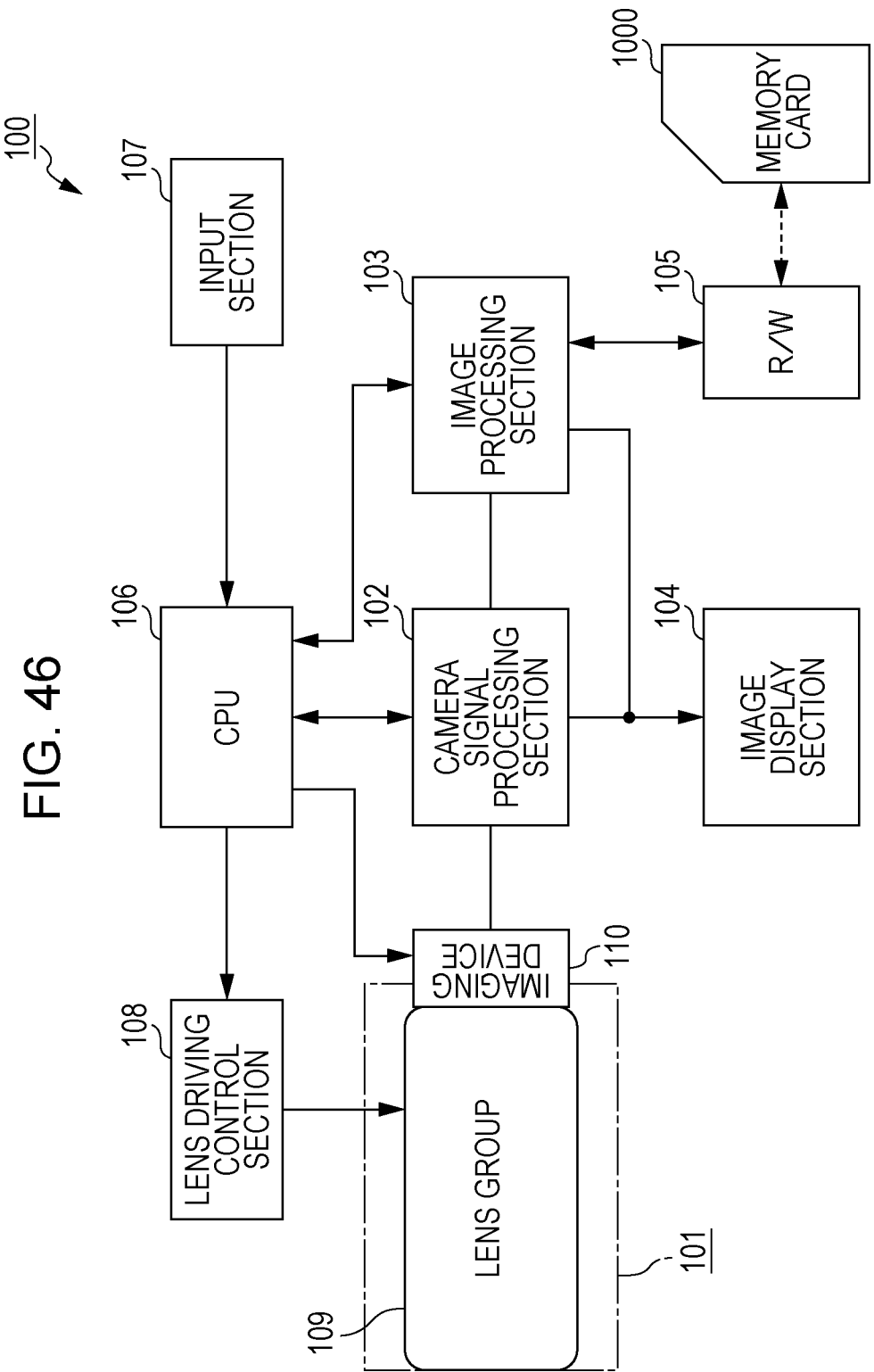

IMAGE BLUR CORRECTION DEVICE HAVING LENS ROTATION ALONG LINES CONNECTING A FULCRUM PORTION TO FIRST AND SECOND DRIVING PORTIONS

CROSS REFERENCE TO RELATED APPLICATIONS

This application claims the benefit of Japanese Priority Patent Application JP 2013-167623 filed Aug. 12, 2013, the entire contents of which are incorporated herein by reference.

BACKGROUND

The present technology relates to a technical field of an image blur correction device, which is rotatable in axial rotation directions of at least two fulcrum axes orthogonal to a lens unit having at least one lens, and an imaging apparatus having the same.

Some imaging apparatuses, such as video cameras, still cameras, and various apparatuses having a built-in camera unit, are provided with an image blur correction device that performs image blur correction by moving a lens in a direction orthogonal to the optical axis direction.

In some image blur correction devices provided in such imaging apparatuses, a lens unit having a lens is rotatable at least in the axial rotation directions of the two fulcrum axes orthogonal to the outer casing, for example, a first direction, which is an axial rotation direction of a first fulcrum axis orthogonal to the optical axis of the lens, and a second direction which is an axial rotation direction of a second fulcrum axis orthogonal to both of the optical axis and the first fulcrum axis (for example, refer to Japanese Unexamined Patent Application Publication No. 07-274056).

The lens unit is rotated in a pitching direction about the first fulcrum axis as a fulcrum and is rotated in a yawing direction about a second fulcrum axis as a fulcrum, thereby correcting image blur.

The image blur correction device described in Japanese Unexamined Patent Application Publication No. 07-274056 is provided with two gimbal mechanisms each having a base plate which is bent in an L-shape in order to rotate the lens unit in the pitching direction and the yawing direction.

One gimbal mechanism performs a blur correction operation in the pitching direction by rotating the lens unit in the pitching direction. The other gimbal mechanism performs a blur correction operation in the yawing direction by rotating integrally one gimbal mechanism and the lens unit in the yawing direction.

SUMMARY

However, in the image blur correction device described in Japanese Unexamined Patent Application Publication No. 07-274056, the two gimbal mechanisms for rotating the lens unit in the pitching direction and the yawing direction are provided. Thus, there is a problem in that, due to the two gimbal mechanisms, the number of components becomes large and a structure becomes complex.

Further, parts of the two gimbal mechanisms are provided to be opposed in a direction orthogonal to the optical axis and overlap with each other. Hence, there is a problem in that, due to the two gimbal mechanisms, the size of the device increases in the direction orthogonal to the optical axis and it becomes difficult to achieve reduction in the size.

Accordingly, in the image blur correction device and the imaging apparatus according to embodiments of the present technology, it is desirable to overcome these problems, simplify the structure thereof, and achieve reduction in the size thereof.

According to a first embodiment of the present technology, there is provided an image blur correction device including: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion so as to rotate the lens unit in the first direction; and a second actuator that has a second driving portion so as to rotate the lens unit in the second direction, in which a fulcrum portion is provided as a point of support on the fixing member of the lens unit, and in which at least one of the first fulcrum axis and the second fulcrum axis is positioned on either one of lines connecting the fulcrum portion to the driving portions.

Thereby, the lens unit is rotatable in the axial rotation direction of the first fulcrum axis or the second fulcrum axis which is positioned on the line connecting the fulcrum portion and the first driving portion or the line connecting the fulcrum portion and the second driving portion.

According to a second embodiment, in the blur correction device, it is preferable that the first fulcrum axis and the second fulcrum axis be respectively positioned on the lines connecting the fulcrum portion to the driving portions.

Thereby, the lens unit is rotated in the first and second directions about the first fulcrum axis and the second fulcrum axis as fulcrums. The first fulcrum axis and the second fulcrum axis are respectively positioned on the lines connecting the fulcrum portion to the driving portions.

According to a third embodiment, in the blur correction device, it is preferable that the first fulcrum axis and the second fulcrum axis be positioned to be coplanar.

Thereby, the lens unit is rotated in the first and second directions about the first fulcrum axis and the second fulcrum axis, which are positioned to be coplanar, as fulcrums.

According to a fourth embodiment, in the blur correction device, it is preferable that the lens unit be rotatable in a third direction which is an axial rotation direction of a third fulcrum axis orthogonal to both of the first fulcrum axis and the second fulcrum axis relative to the fixing member, and it is preferable that a third actuator, which has a third driving portion so as to rotate the lens unit in the third direction, be provided.

Thereby, in addition to the first and second directions, the lens unit is rotated also in the third direction about the third fulcrum axis as a fulcrum.

According to a fifth embodiment, in the blur correction device, it is preferable that the fulcrum portion be positioned on the optical axis.

Thereby, the lens unit is rotated about the fulcrum axis, which passes through the optical axis, as a fulcrum. As a result, an amount of rotation of the lens unit is minimized.

According to a sixth embodiment, in the blur correction device, it is preferable that the driving portion be movable in an axial direction of the fulcrum axis, an operating surface, which is oblique to the fulcrum axis, be formed on the driving portion, a driven portion, of which the operating surface is slidable at the time of movement of the driving portion, be provided in the lens unit, and the lens unit be rotated by changing a position on the operating surface coming into contact with the driven portion.

Thereby, when the driving portion is moved, the position on the operating surface coming into contact with the driven portion is changed, and thus the lens unit is rotated.

According to a seventh embodiment, in the blur correction device, it is preferable that the operating surface be formed in a planar shape.

Thereby, it becomes easy to form the driving portion.

According to an eighth embodiment, in the blur correction device, it is preferable that the operating surface be formed in a curved shape convex toward the driven portion.

Thereby, it is difficult to change both contact positions when changing the angle of the driven portion to the operating surface at the time of rotation of the lens unit.

According to a ninth embodiment, in the blur correction device, it is preferable that the operating surface be formed of two planar portions which are oblique, and it is preferable that an intersection line portion between the two planar portions be slidable on the driven portion.

Thereby, both contact positions do not change when the angle of the driven portion to the operating surface is changed at the time of rotation of the lens unit.

According to a tenth embodiment, in the blur correction device, it is preferable that a bias spring for urging the lens unit in a direction, in which the driven portion is pressed against the operating surface, be provided.

Thereby, an excellent condition of contact of the driven portion with the operating surface is secured.

According to an eleventh embodiment, in the blur correction device, it is preferable that a rotatable roller be provided as the driven portion, and it is preferable that the driven portion be rotated when the operating surface slides on the driven portion.

Thereby, a load of contact of the driving portion with the driven portion at the time of rotation of the lens unit is small.

In order to solve the above problems, there is provided an imaging apparatus including: an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis, in which the image blur correction device includes a fixing member that rotatably supports the lens unit in the first and second directions, a first actuator that has a first driving portion so as to rotate the lens unit in the first direction, and a second actuator that has a second driving portion so as to rotate the lens unit in the second direction, in which a fulcrum portion is provided as a point of support on the fixing member of the lens unit, and in which at least one of the first fulcrum axis and the second fulcrum axis is positioned on either one of lines connecting the fulcrum portion to the driving portions.

Thereby, in the blur correction device, the lens unit is rotatable in the axial rotation direction of the first fulcrum axis or the second fulcrum axis which is positioned on the line connecting the fulcrum portion and the first driving portion or the line connecting the fulcrum portion and the second driving portion.

In the image blur correction device and the imaging apparatus according to the embodiments of the present technology, the lens unit is rotatable in the axial rotation direction of the first fulcrum axis or the second fulcrum axis which is positioned on the line connecting the fulcrum portion and the first driving portion or the line connecting the fulcrum portion and the second driving portion. Hence, it is possible to simplify the structure and achieve reduction in the size of the device.

BRIEF DESCRIPTION OF THE DRAWINGS

FIG. 46 is a block diagram of an imaging apparatus.

DETAILED DESCRIPTION OF EMBODIMENTS

Hereinafter, embodiments of the image blur correction device and imaging apparatus of the present technology will be described with reference to the accompanying drawings.

In the embodiments to be described later, an imaging apparatus of the present technology is applied to a mobile phone, and an image blur correction device of the present technology is applied to an image blur correction device which is provided in each of the mobile phone and a video camera.

In addition, the applicable scopes of the imaging apparatus and the image blur correction device of the present technology are not limited to the mobile phone and the image blur correction devices which are respectively provided in the mobile phone and the video camera. The imaging apparatus and the image blur correction device of the present technology can be widely applied to, for example, a still camera, a video camera, a personal computer, an imaging apparatus which is provided in each of various devices such as a mobile terminal, or an image blur correction device which is provided in such an imaging apparatus.

In the following description, front-back, vertical, and horizontal directions are indicated in terms of a direction viewed from a photographer at the time of photography using a mobile phone. Accordingly, the subject side is a front side, and the photographer side is a rear side.

It should be noted that the front-back, vertical, and horizontal directions to be described later are directions for convenience of description, and the present technology does not have to be limited to such directions.

Further, the lens to be described later is defined to include both of a lens system formed of a single lens and a lens system formed of a plurality of lenses as a lens group.

Overall Configuration of Imaging Apparatus

Figure 1:
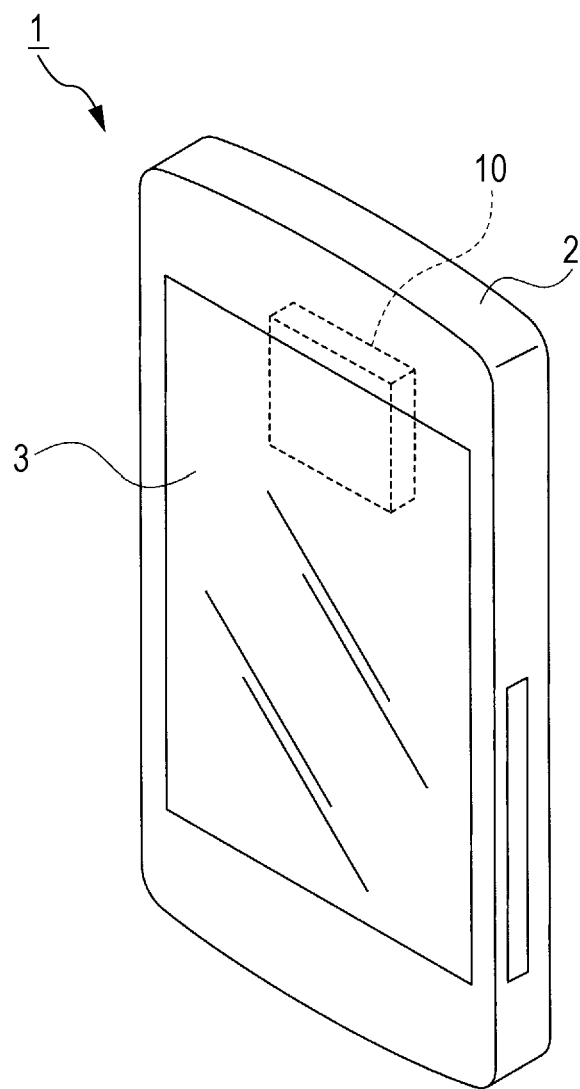
FIG. 1 is a perspective view illustrating an image blur correction device and an imaging apparatus according to the embodiments of the present technology together with FIGS. 2 to 46.
Figure 2:
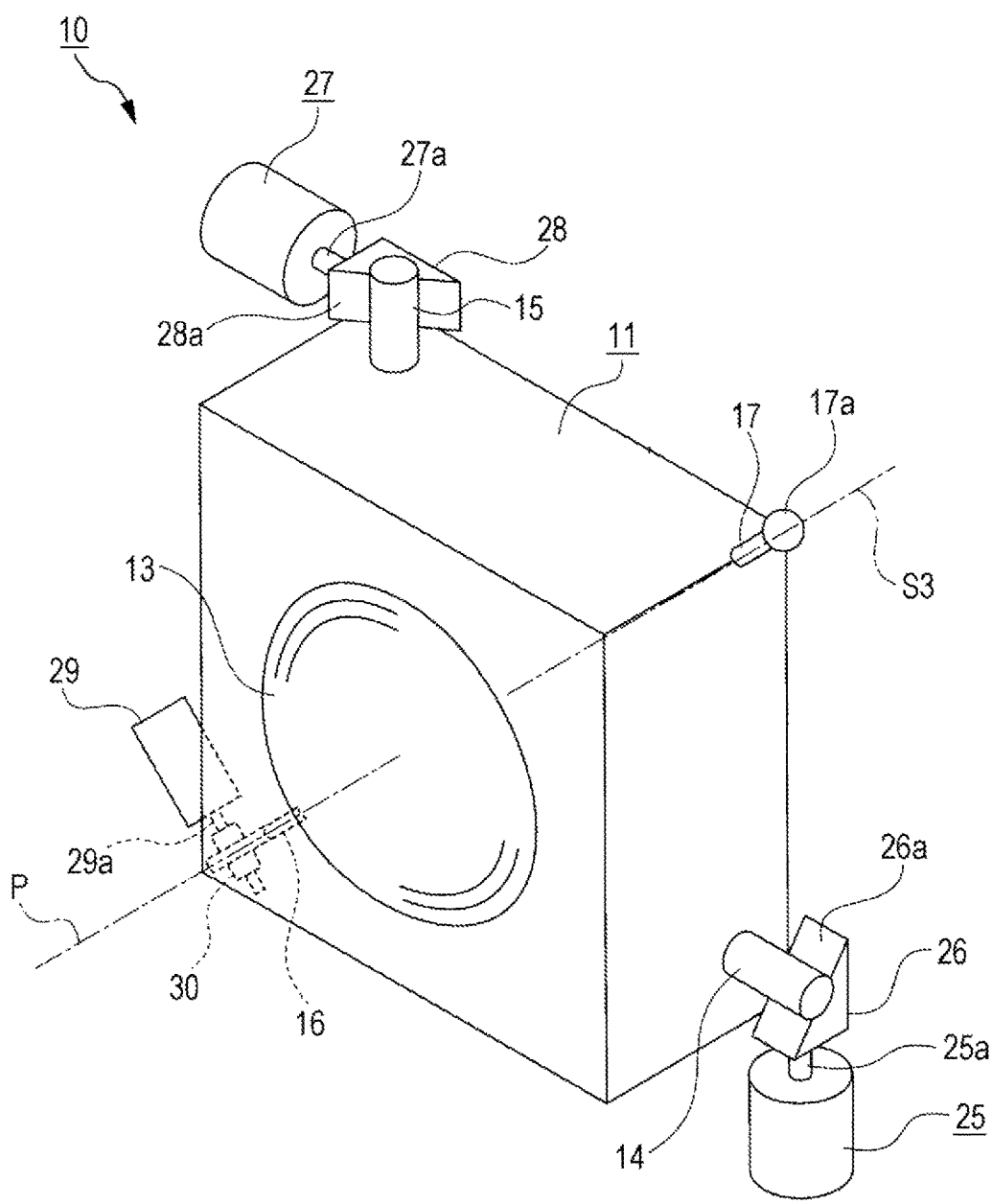
FIG. 2 is a schematic perspective view illustrating an image blur correction device according to a first embodiment together with FIGS. 3 to 15.

An imaging apparatus (mobile phone) 1 is formed such that necessary respective sections are disposed inside and outside an outer casing 2 (refer to FIG. 1). The outer casing 2 is formed, for example, in a casing shape which is long and planar in the vertical direction, and a display panel 3 is provided on one surface thereof. The display panel 3 is formed as a touch panel, and a predetermined function is executed by performing touching operations at respective predetermined positions on the display panel 3.

An image blur correction device 10 (10A) for performing blur correction is disposed inside the outer casing 2.

Configuration (First Embodiment) of Image Blur Correction Device

Hereinafter, a configuration of an image blur correction device 10 according to a first embodiment will be described (refer to FIGS. 2 to 5).

The image blur correction device 10 has a lens unit 11 and a fixing member 12 that supports the lens unit 11.

The lens unit 11 has a barrel portion 12a that has a substantially rectangular parallelepiped shape, of which a width in the front-back direction is set to be small as compared with vertical and horizontal widths, and a plurality of lenses or a lens group that is disposed in the barrel portion 12a. A photography lens 13, which is referred to as a front lens, is disposed on the frontmost side (object side) of the lenses or the lens group.

The lens unit 11 has a first driven portion 14 that protrudes leftward from the position close to the lower end on the left side surface, a second driven portion 15 that protrudes upward from the position close to the right end on the upper surface, and a third driven portion 16 that protrudes diagonally downward right from the right end portion on the lower surface. The first driven portion 14 and the second driven portion 15 are formed in cylindrical shapes. A supporting hole 16a is formed in the third driven portion 16 so as to extend in the front-back direction.

The lens unit 11 is provided with a fulcrum portion 17 that protrudes diagonally upward left from the left end portion on the upper surface, and the tip portion of the fulcrum portion 17 is provided as a spherical portion 17a.

The lens unit 11 is provided with a first spring latch portion 18 that protrudes downward from the position close to the left end on the lower surface, and a second spring latch portion 19 that protrudes rightward from the position close to the upper end on the right side surface.

The fixing member 12 includes: a base surface portion 20 that faces the front and back sides; a first holding portion 21 that extends to the lower left end portion of the base surface portion 20; a second holding portion 22 that extends to the upper right end portion of the base surface portion 20; a third holding portion 23 that extends to the lower right end portion of the base surface portion 20; and a bearing portion 24 that extends to the upper left end portion of the base surface portion 20. The fixing member 12 is fixed inside the lens unit 11.

The first holding portion 21 of the fixing member 12 holds a first actuator 25. The first actuator 25 has a first driving shaft 25a that is movable in the vertical direction, and a first driving portion 26 is fixed onto the first driving shaft 25a. Accordingly, the first driving portion 26 is moved in the vertical direction by movement of the first driving shaft 25a.

A first operating surface 26a, which faces the diagonal upper front side, is formed on the first driving portion 26. The first operating surface 26a of the first driving portion 26 is slidable on the first driven portion 14.

The second holding portion 22 of the fixing member 12 holds a second actuator 27. The second actuator 27 has a second driving shaft 27a that is movable in the horizontal direction, and a second driving portion 28 is fixed onto the second driving shaft 27a. Accordingly, the second driving portion 28 is moved in the horizontal direction by movement of the second driving shaft 27a.

A second operating surface 28a, which faces the diagonal upper front side, is formed on the second driving portion 28. The second operating surface 28a of the second driving portion 28 is slidable on the second driven portion 15.

The third holding portion 23 of the fixing member 12 holds a third actuator 29. The third actuator 29 has a third driving shaft 29a that is movable between the diagonal upper right side and the diagonal lower left side, and a third driving portion 30 is fixed onto the third driving shaft 29a. Accordingly, the third driving portion 30 is moved between the diagonal upper right side and the diagonal lower left side by movement of the third driving shaft 29a.

The intermediate part of the third driving portion 30 is provided as a sliding engagement portion 30a which is made to be smaller than the other parts thereof. The outer shape of the sliding engagement portion 30a is formed to be a rectangular shape or a circular shape.

The sliding engagement portion 30a of the third driving portion 30 is supported to be slidable in the front-back direction by the supporting hole 16a of the third driven portion 16, and is configured not to be rotatable in the shaft rotation direction of the third driving shaft 29a and not to be movable in the shaft direction thereof with respect to the third driven portion 16. In addition, a small gap is formed between the sliding engagement portion 30a and the supporting hole 16a in the width direction of the supporting hole 16a. Due to the gap formed between the sliding engagement portion 30a and the supporting hole 16a, the third driven portion 16 is smoothly moved relative to the third driving portion 30 when the lens unit 11 is rotated in a first direction or a second direction to be described later.

The spherical portion 17a of the fulcrum portion 17 is supported by the bearing portion 24 of the fixing member 12 to be rotatable in an arbitrary direction. Accordingly, the lens unit 11 is configured to be rotatable in the arbitrary direction by using the spherical portion 17a as the rotation fulcrum relative to the fixing member 12.

In the above description of the example, the bearing portion 24, which is concave, is provided on the fixing member 12, and the fulcrum portion 17, which is inserted into the bearing portion 24, is provided on the lens unit 11. However, on the contrary, it may be possible to adopt the following configuration: the bearing portion is provided on the lens unit, and the fulcrum portion, which is inserted into the bearing portion, is provided on the fixing member.

A first bias spring 31 is supported between the first spring latch portion 18 of the lens unit 11 and the fixing member 12. Accordingly, the lens unit 11 is urged backward by the first bias spring 31, and thus the first driven portion 14 is pressed against the first operating surface 26a of the first driving portion 26.

A second bias spring 32 is supported between the second spring latch portion 19 of the lens unit 11 and the fixing member 12. Accordingly, the lens unit 11 is urged backward by the second bias spring 32, and thus the second driven portion 15 is pressed against the second operating surface 28a of the second driving portion 28.

The lens unit 11 is configured to be rotatable in a first direction (pitching direction), which is an axial rotation direction of a first fulcrum axis S1, relative to the fixing member 12. Further, the lens unit 11 is configured to be rotatable in a second direction (yawing direction), which is an axial rotation direction of a second fulcrum axis S2, relative to the fixing member 12. Furthermore, the lens unit 11 is configured to be rotatable in a third direction (rolling direction), which is an axial rotation direction of a third fulcrum axis S3, relative to the fixing member 12.

The first fulcrum axis S1, the second fulcrum axis S2, and the third fulcrum axis S3 are orthogonal to one another. For example, the first fulcrum axis S1 and the second fulcrum axis S2 are positioned on the same plane orthogonal to an optical axis P. The first fulcrum axis S1, which is set as a rotation axis in the pitching direction, is positioned on the line connecting the spherical portion 17a of the fulcrum portion 17 and the second driving portion 28. The second fulcrum axis S2, which is set as a rotation axis in the yawing direction, is positioned on the line connecting the spherical portion 17a of the fulcrum portion 17 and the first driving portion 26. The third fulcrum axis S3, which is set as a rotation axis in the rolling direction, is positioned on the line parallel with the optical axis P passing through the spherical portion 17a of the fulcrum portion 17.

In the image blur correction device 10, at least one of the respective axes of the first fulcrum axis S1 and the second fulcrum axis S2 may be positioned on either one of the respective lines of the line connecting the fulcrum portion 17 and the second driving portion 28 or the line connecting the fulcrum portion 17 and the first driving portion 26.

Further, in the above description of the example, the first direction, the second direction, and the third direction are respectively set as the pitching direction, the yawing direction, and the rolling direction. However, each of the first direction, the second direction, and the third direction may be set as any of the pitching direction, the yawing direction, and the rolling direction.

Operation (First Embodiment) of Image Blur Correction Device

Hereinafter, a blur correction operation in the image blur correction device 10 will be described (refer to FIGS. 3 to 16).

Figure 3:
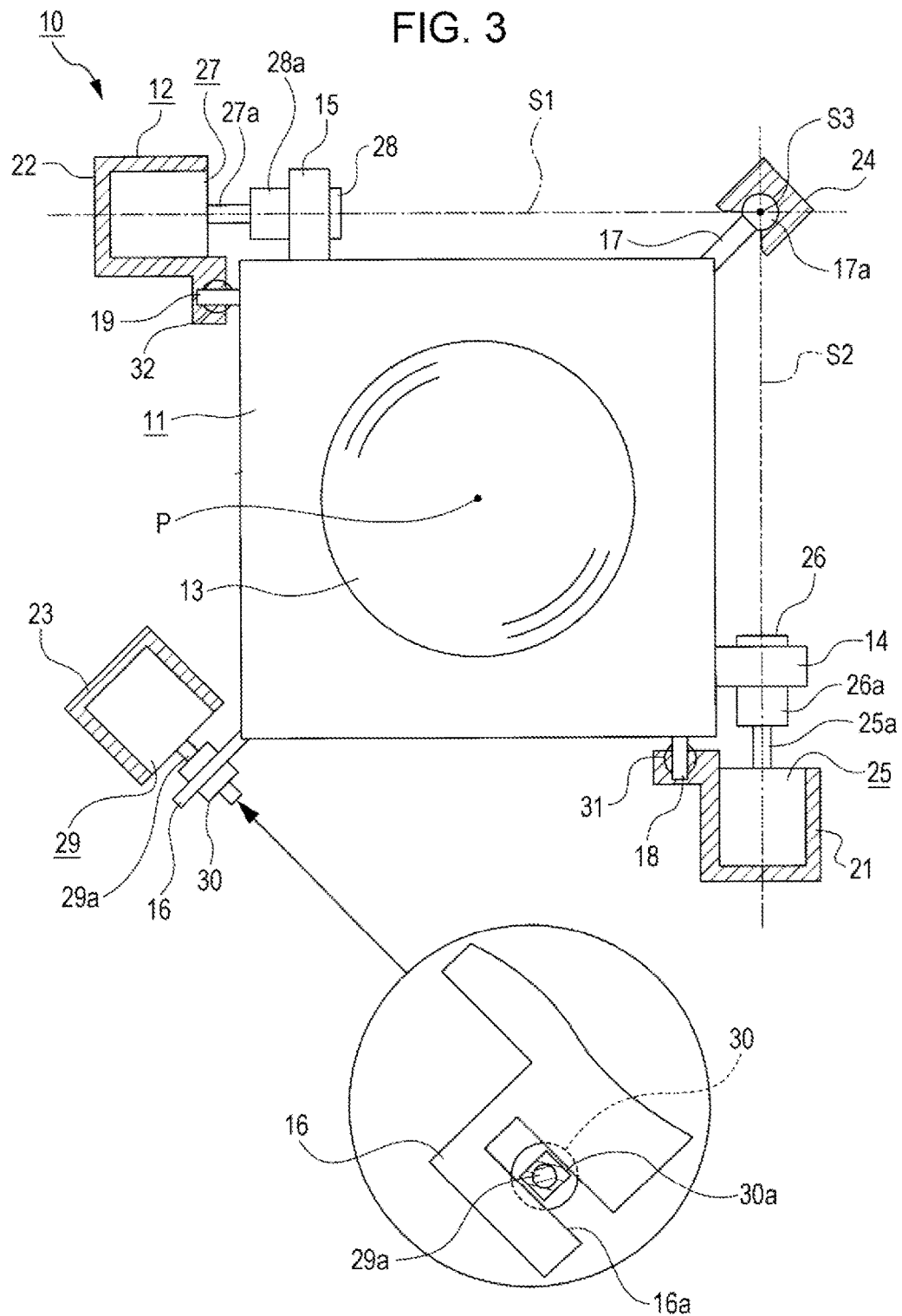
FIG. 3 is a schematic front view of the image blur correction device.
Figure 4:
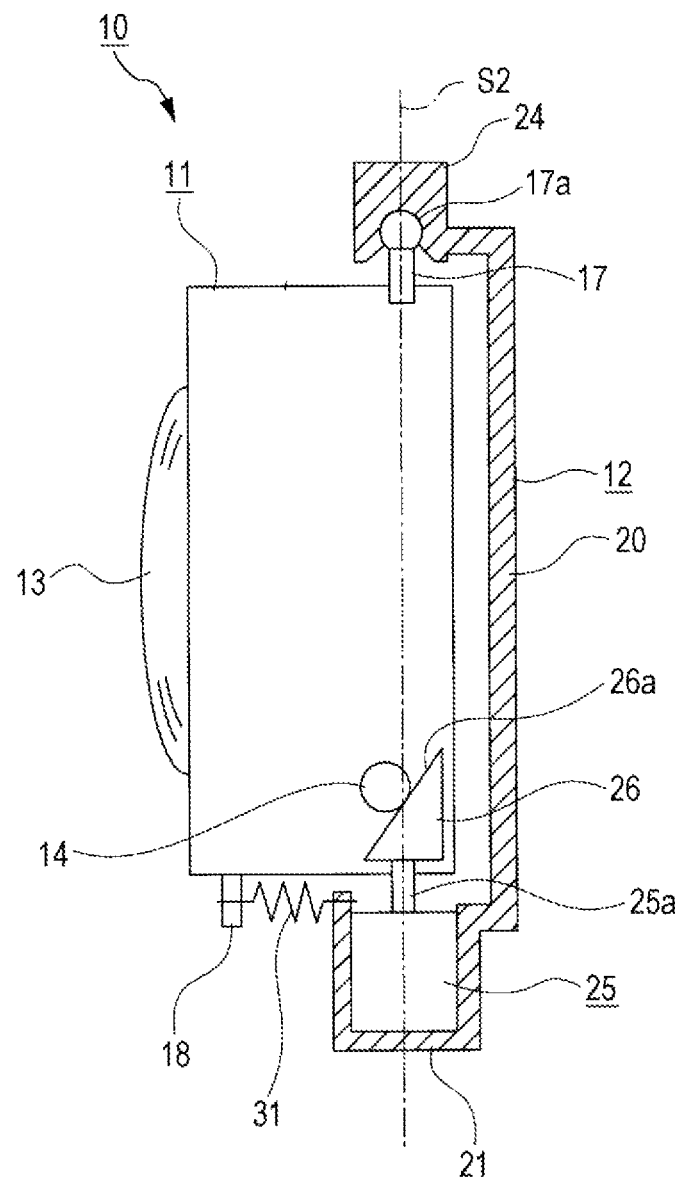
FIG. 4 is a schematic side view of the image blur correction device.
Figure 5:
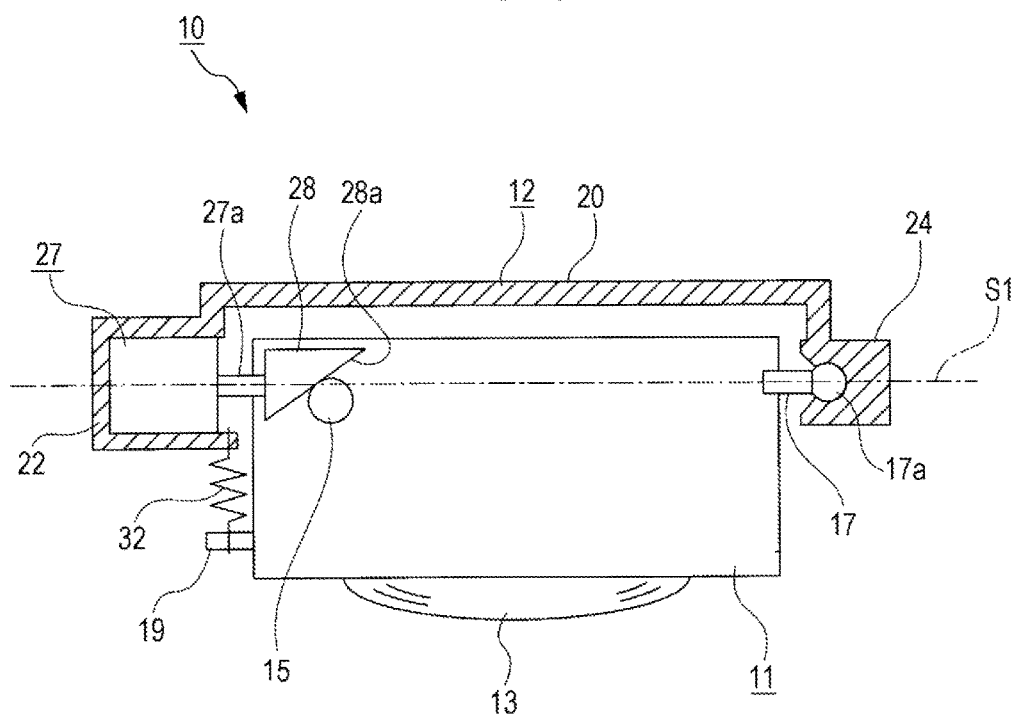
FIG. 5 is a schematic top plan view of the image blur correction device.
Figure 6:
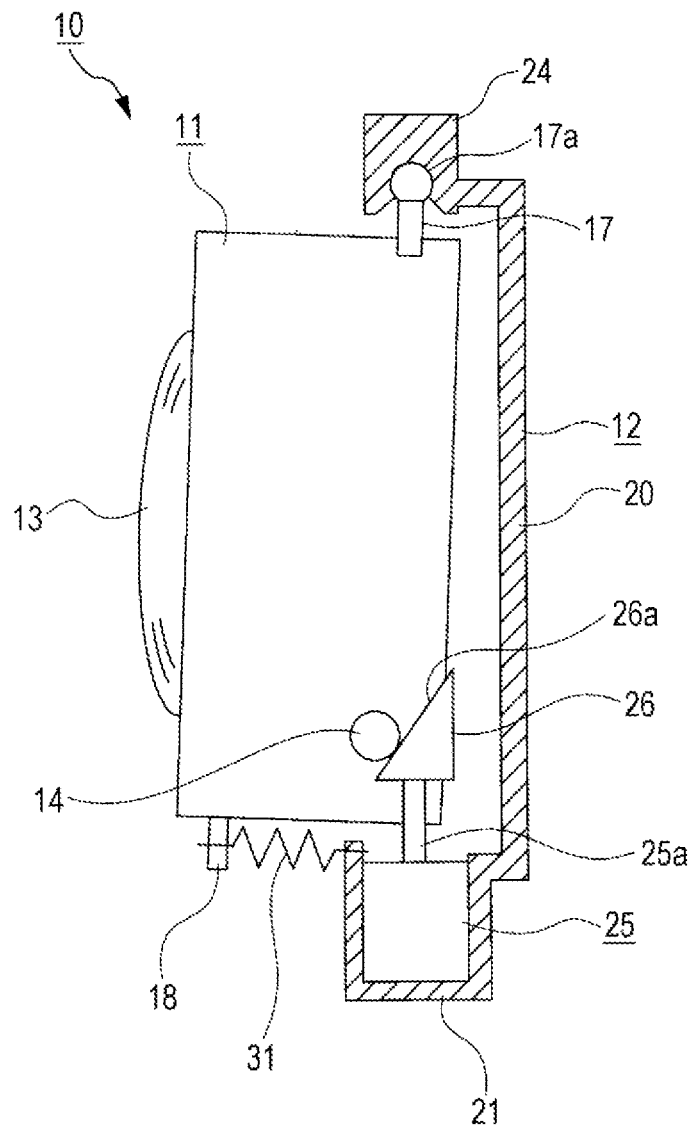
FIG. 6 is a schematic side view illustrating an operation of the image blur correction device in a condition where the lens unit is rotated toward one side in the first direction together with FIGS. 7 to 15.
Figure 7:
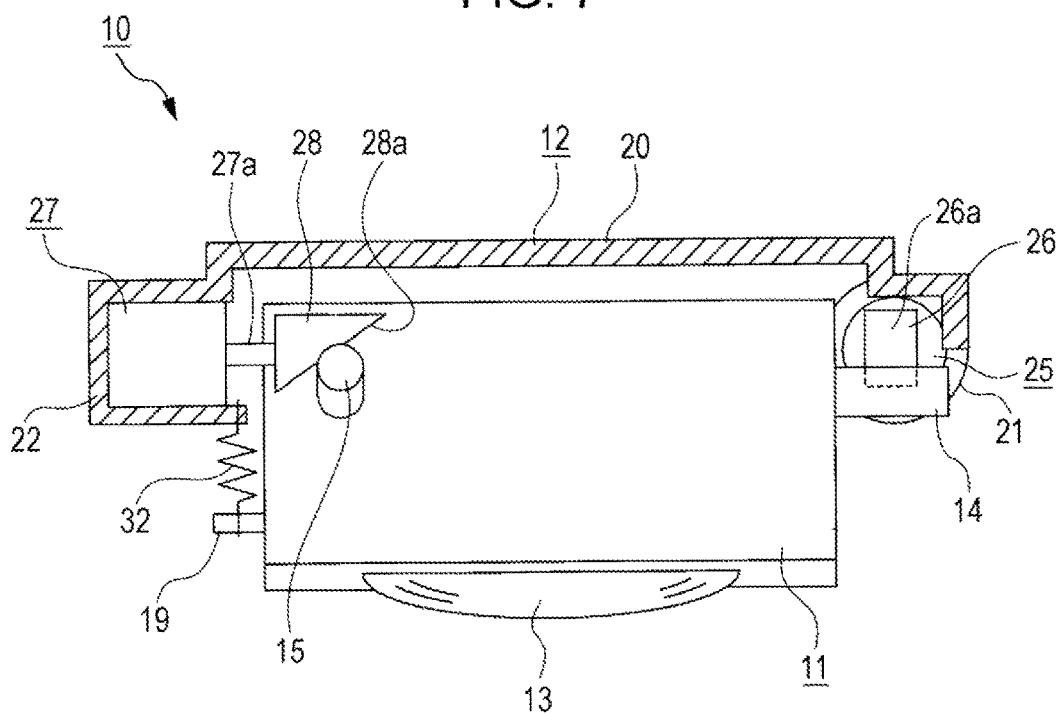
FIG. 7 is a schematic top plan view illustrating a condition of the device in a second direction when the lens unit is rotated toward one side in the first direction.

In a state where the blur correction operation is not performed, the image blur correction device 10 is at a reference position at which the lens unit 11 is not rotated in any one direction of the first direction, the second direction, and the third direction (refer to FIGS. 3 to 5).

First, a blur correction operation in the first direction (pitching direction) in the image blur correction device 10 will be described (refer to FIGS. 6 to 9).

In the image blur correction device 10, when the first driving shaft 25a of the first actuator 25 is moved upward and thereby the first driving portion 26 is moved upward, the first operating surface 26a slides on the first driven portion 14. Thereby, the lens unit 11 is rotated about the first fulcrum axis S1 as a fulcrum in the first direction in which the photography lens 13 faces slightly upward against an elastic force of the first bias spring 31 (refer to FIG. 6).

At this time, the second driven portion 15 comes into contact with the second driving portion 28 of the second actuator 27. However, in accordance with the rotation of the lens unit 11 in the first direction, a condition of contact between the second driving portion 28 and the second driven portion 15 is slightly changed (refer to FIG. 7).

Figure 8:
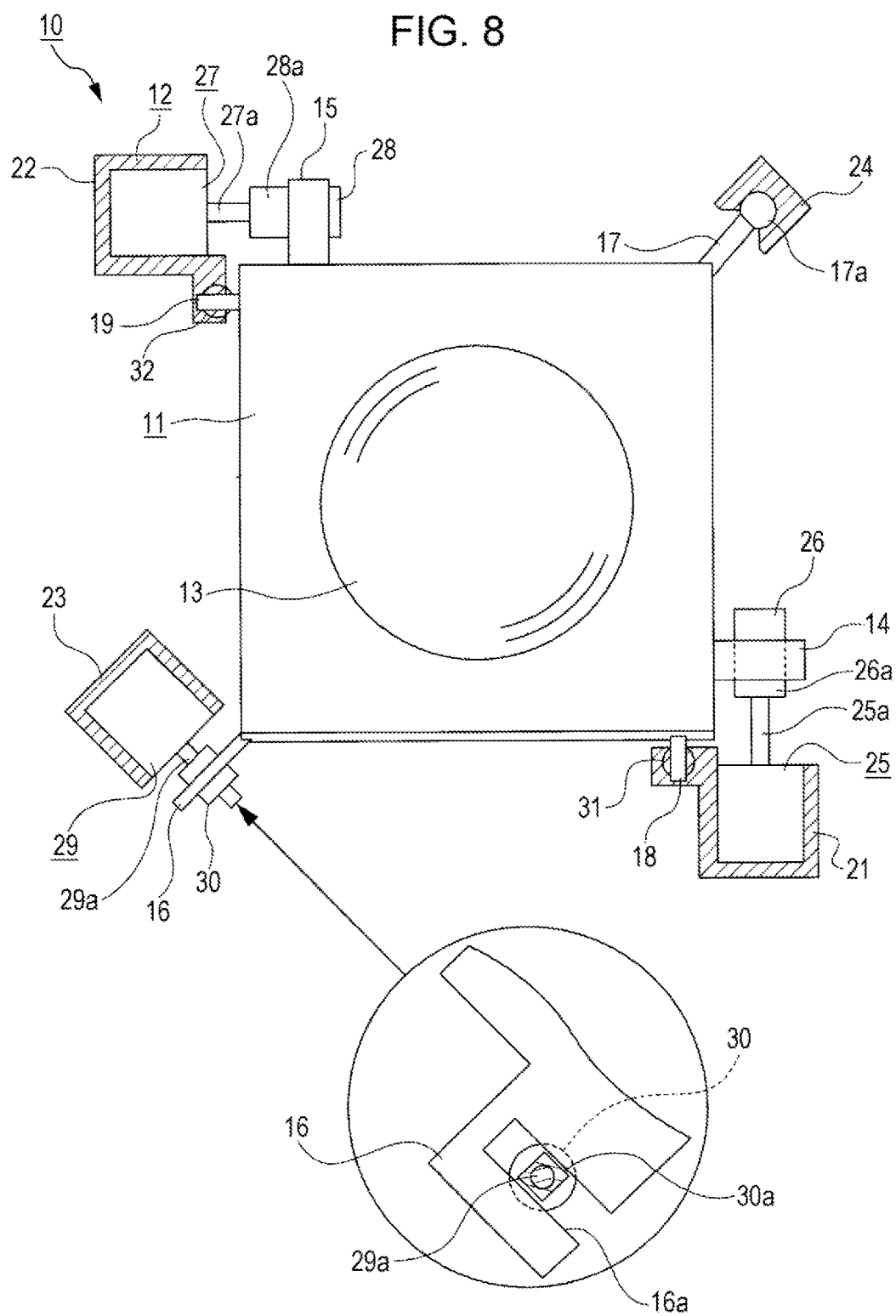
FIG. 8 is a schematic front view illustrating a condition of the device in a third direction when the lens unit is rotated toward one side in the first direction.
Figure 9:
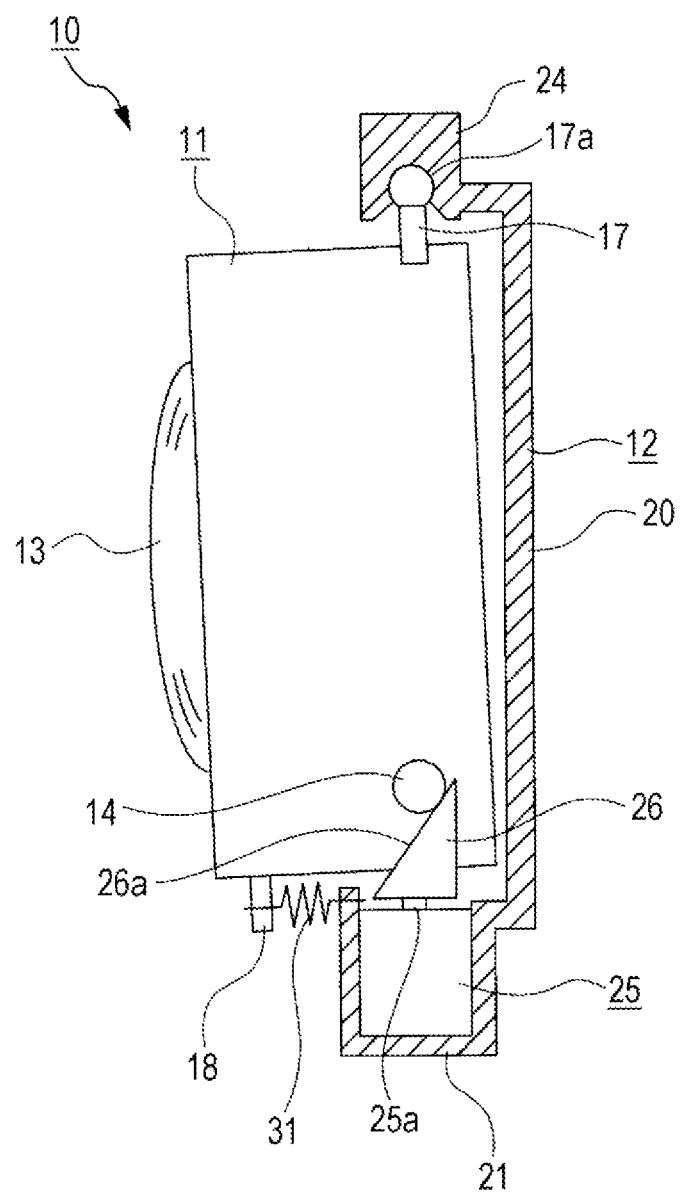
FIG. 9 is a schematic side view illustrating a condition where the lens unit is rotated toward the other side in the first direction.
Figure 10:
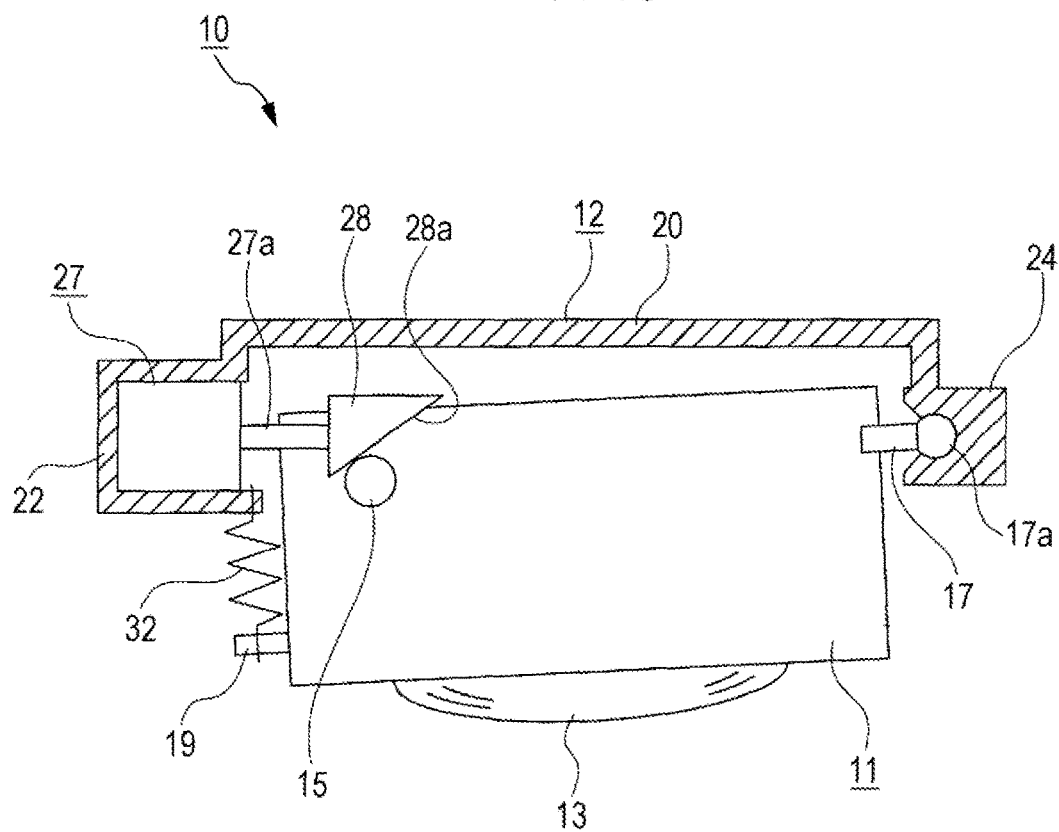
FIG. 10 is a schematic top plan view illustrating a condition where the lens unit is rotated toward one side in the second direction.
Figure 11:
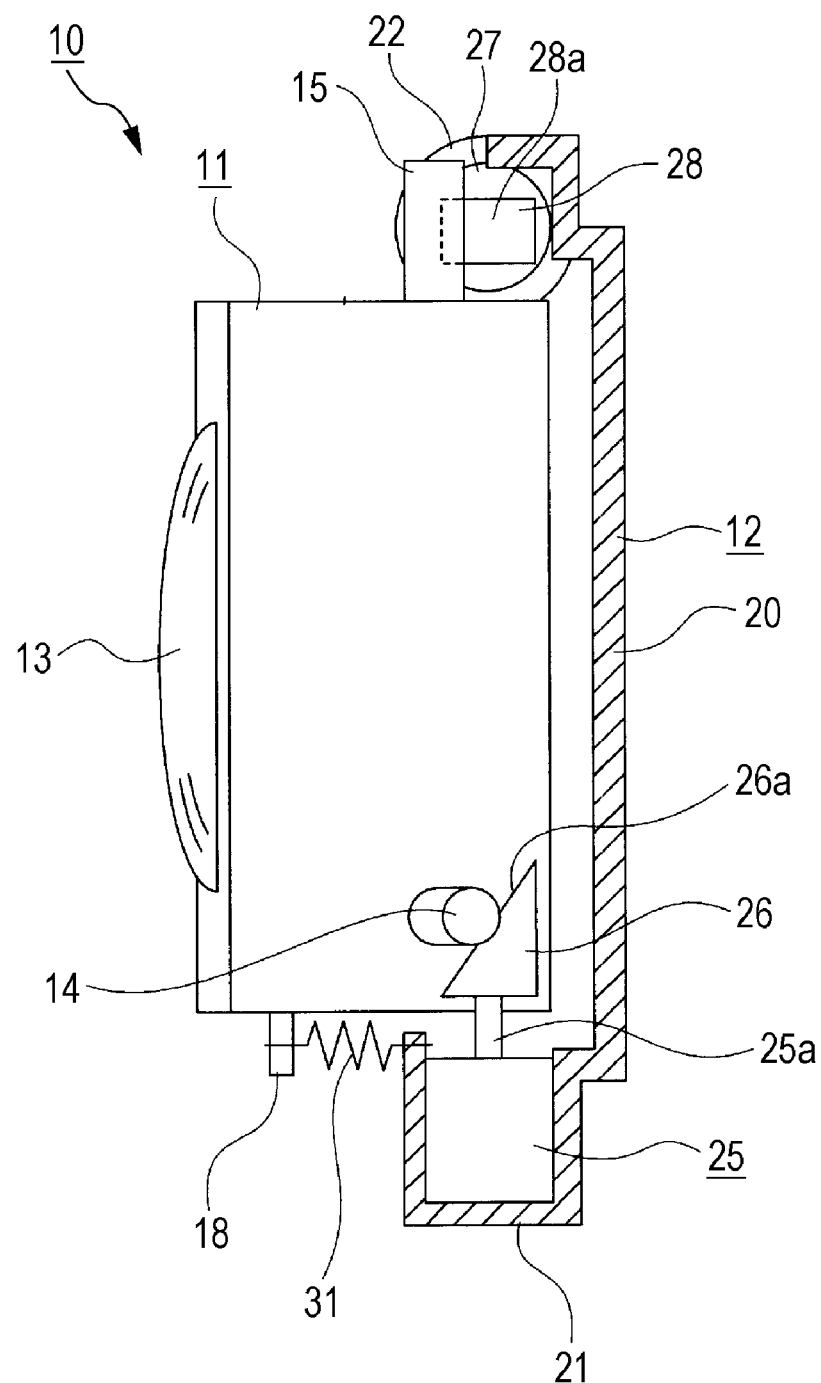
FIG. 11 is a schematic side view illustrating a condition of the device in the first direction when the lens unit is rotated toward one side in the second direction.

Simultaneously, the third driving portion 30 of the third actuator 29 slides on the third driven portion 16 in accordance with the rotation of the lens unit 11 in the first direction, and the engagement position of the supporting hole 16a is changed (refer to FIG. 8).

When the lens unit 11 is rotated in the first direction in such a manner, in accordance with the rotation of the lens unit 11, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11 from the second driving portion 28 and the third driving portion 30. Accordingly, the lens unit 11 is smoothly rotated in the first direction.

On the other hand, in the image blur correction device 10, when the first driving shaft 25a of the first actuator 25 is moved downward and thereby the first driving portion 26 is moved downward, the first operating surface 26a slides on the first driven portion 14. Thereby, the lens unit 11 is rotated about the first fulcrum axis S1 as a fulcrum in the first direction in which the photography lens 13 faces slightly downward due to the elastic force of the first bias spring 31 (refer to FIG. 9).

At this time, the second driven portion 15 comes into contact with the second driving portion 28 of the second actuator 27. However, in accordance with the rotation of the lens unit 11 in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11 in the first direction, and the engagement position of the supporting hole 16a is changed.

When the lens unit 11 is rotated in the first direction in such a manner, in accordance with the rotation of the lens unit 11, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11 from the second driving portion 28 and the third driving portion 30. Accordingly, the lens unit 11 is smoothly rotated in the first direction.

Next, a blur correction operation in the second direction (yawing direction) in the image blur correction device 10 will be described (refer to FIGS. 10 to 13).

In the image blur correction device 10, when the second driving shaft 27a of the second actuator 27 is moved leftward and thereby the second driving portion 28 is moved leftward, the second operating surface 28a slides on the second driven portion 15. Thereby, the lens unit 11 is rotated about the second fulcrum axis S2 as a fulcrum in the second direction in which the photography lens 13 faces slightly leftward against an elastic force of the second bias spring 32 (refer to FIG. 10).

At this time, the first driven portion 14 comes into contact with the first driving portion 26 of the first actuator 25. However, in accordance with the rotation of the lens unit 11 in the second direction, a condition of contact between the first driving portion 26 and the first driven portion 14 is slightly changed (refer to FIG. 11).

Figure 12:
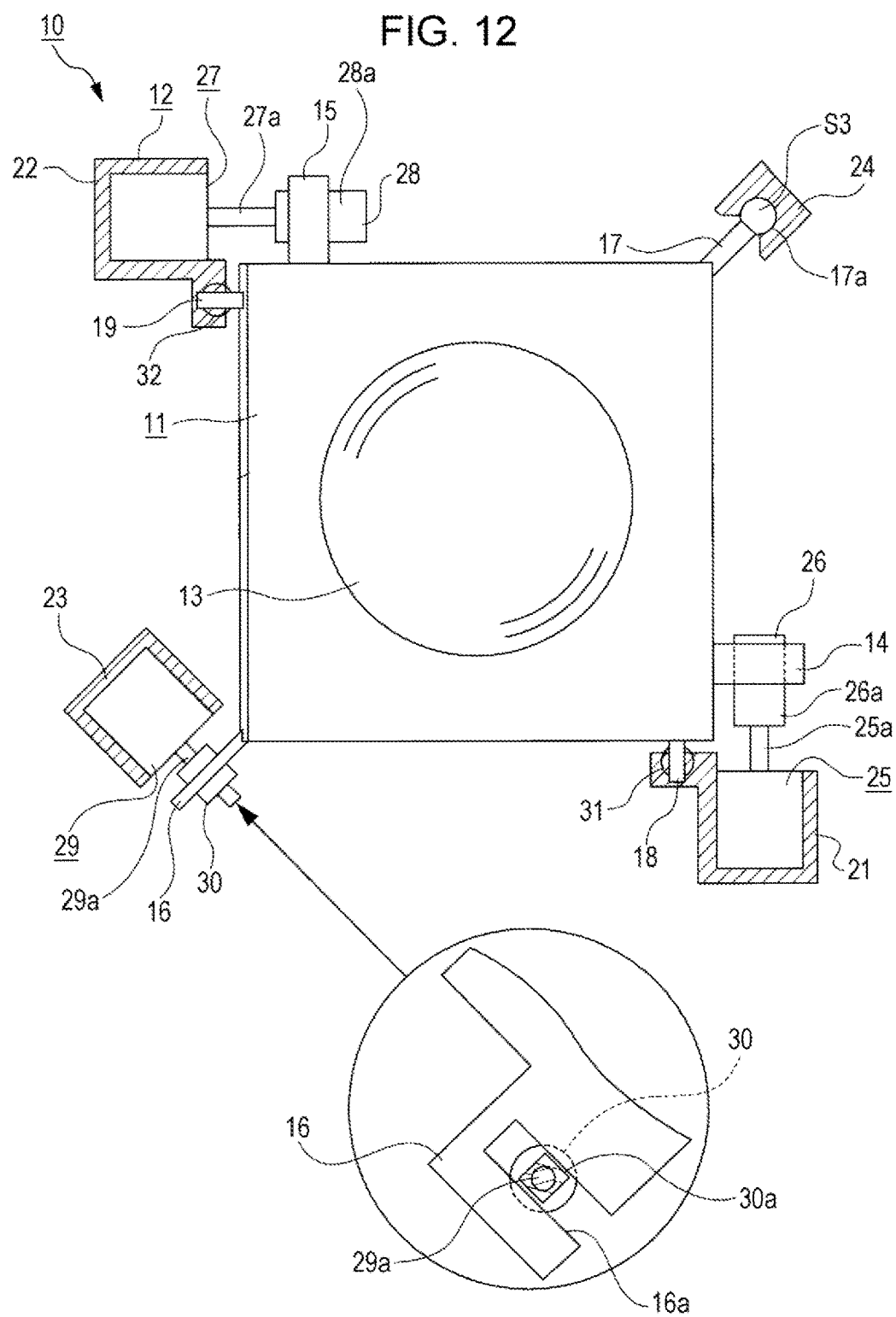
FIG. 12 is a schematic front view illustrating a condition of the device in the third direction when the lens unit is rotated toward one side in the second direction.
Figure 13:
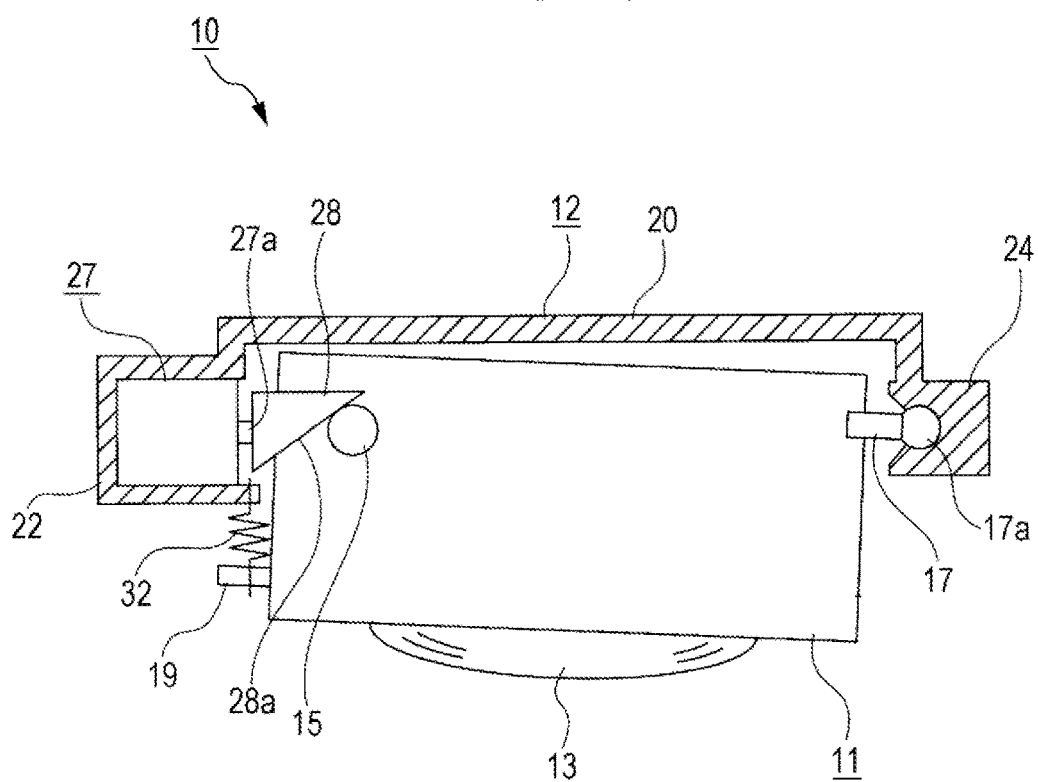
FIG. 13 is a schematic top plan view illustrating a condition where the lens unit is rotated toward the other side in the second direction.

Simultaneously, the third driving portion 30 of the third actuator 29 slides on the third driven portion 16 in accordance with the rotation of the lens unit 11 in the second direction, and the engagement position of the supporting hole 16a is changed (refer to FIG. 12).

When the lens unit 11 is rotated in the second direction in such a manner, in accordance with the rotation of the lens unit 11, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11 from the first driving portion 26 and the third driving portion 30. Accordingly, the lens unit 11 is smoothly rotated in the second direction.

On the other hand, in the image blur correction device 10, when the second driving shaft 27a of the second actuator 27 is moved rightward and thereby the second driving portion 28 is moved rightward, the second operating surface 28a slides on the second driven portion 15. Thereby, the lens unit 11 is rotated about the second fulcrum axis S2 as a fulcrum in the second direction in which the photography lens 13 faces slightly rightward due to the elastic force of the second bias spring 32 (refer to FIG. 13).

At this time, the first driven portion 14 comes into contact with the first driving portion 26 of the first actuator 25. However, in accordance with the rotation of the lens unit 11 in the second direction, the condition of contact between the first driving portion 26 and the first driven portion 14 is slightly changed.

Simultaneously, the third driving portion 30 of the third actuator 29 slides on the third driven portion 16 in accordance with the rotation of the lens unit 11 in the second direction, and the engagement position of the supporting hole 16a is changed.

When the lens unit 11 is rotated in the second direction in such a manner, in accordance with the rotation of the lens unit 11, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11 from the first driving portion 26 and the third driving portion 30. Accordingly, the lens unit 11 is smoothly rotated in the second direction.

Figure 14:
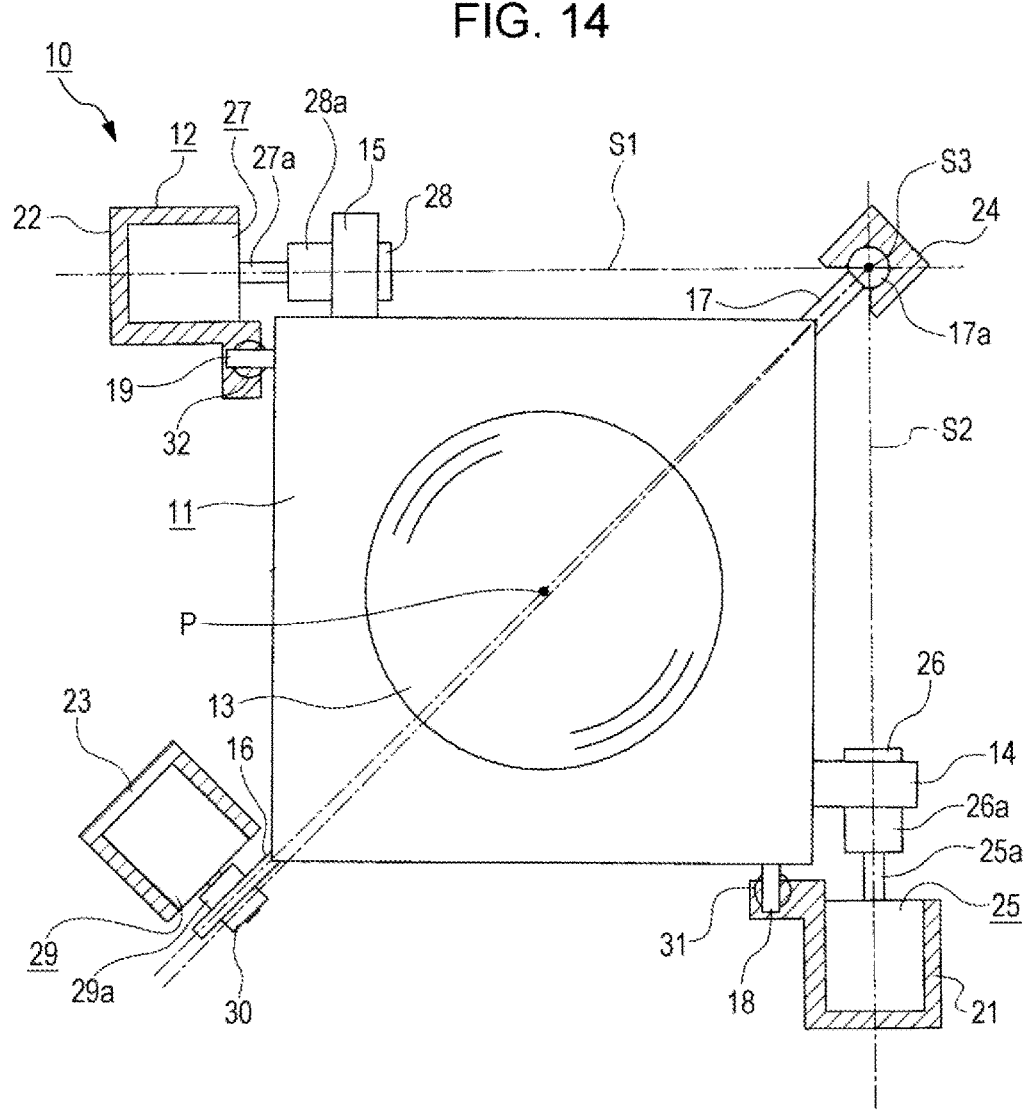
FIG. 14 is a schematic front view illustrating a condition where the lens unit is rotated toward one side in the third direction.
Figure 15:
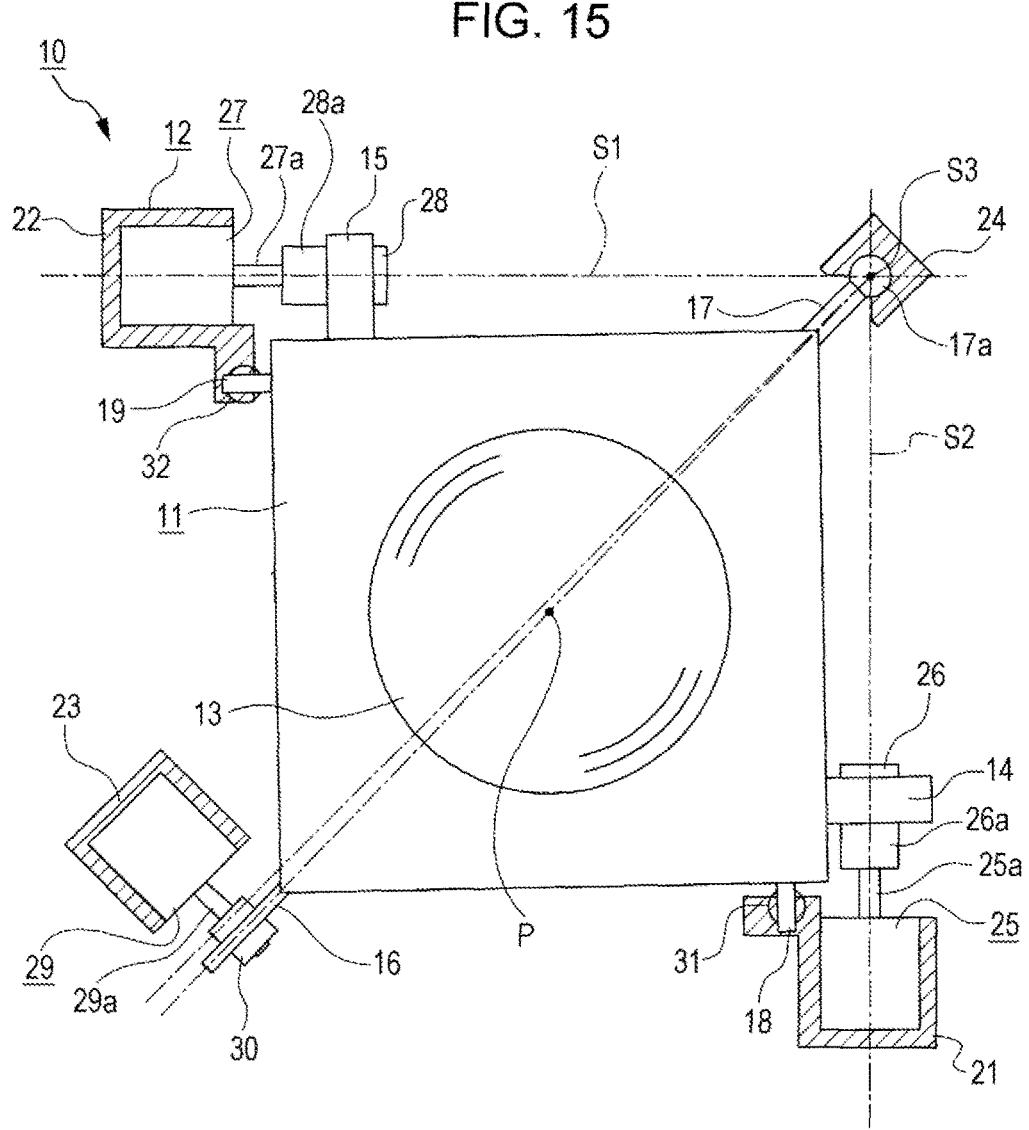
FIG. 15 is a schematic front view illustrating a condition where the lens unit is rotated toward the other side in the third direction.
Figure 16:
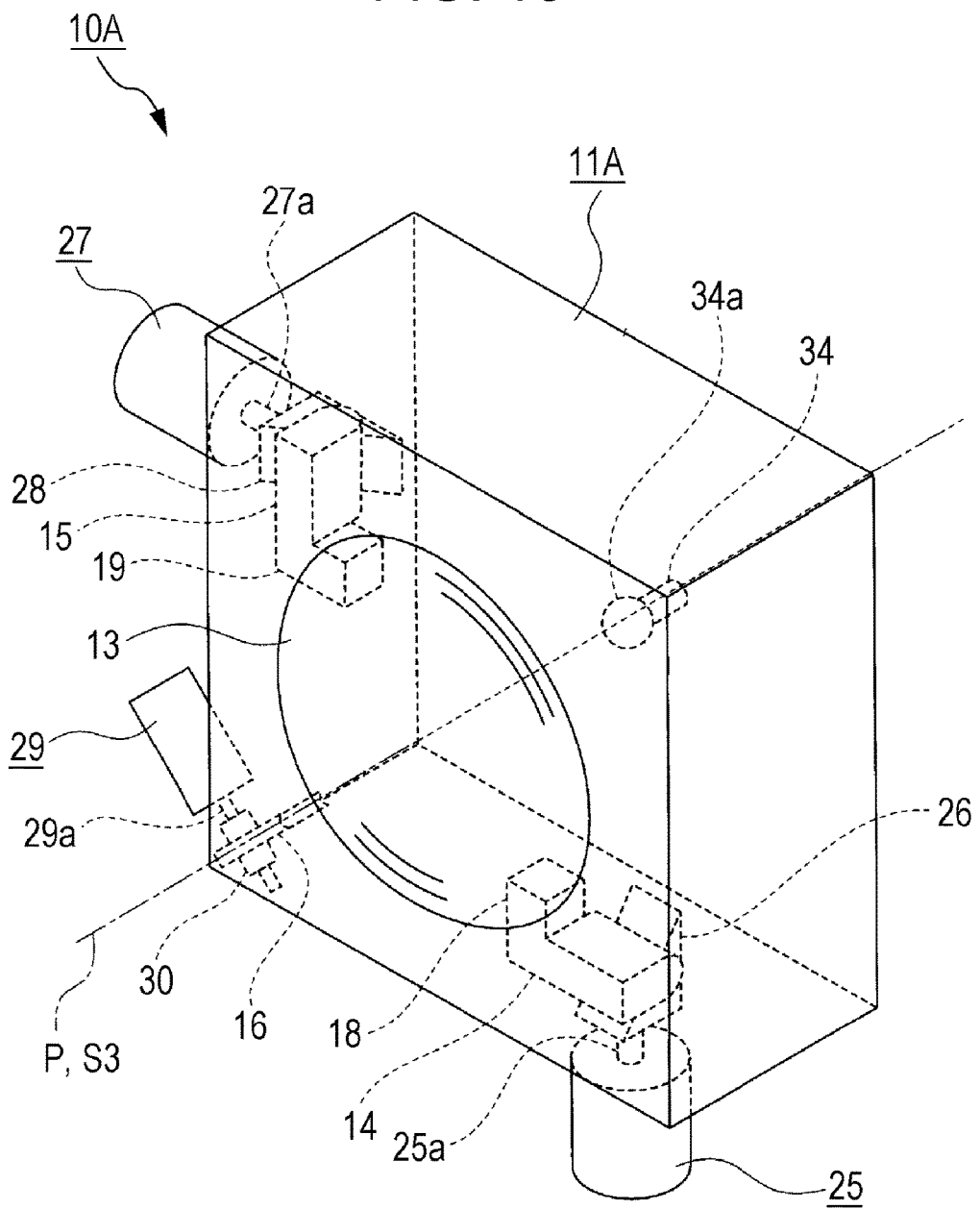
FIG. 16 is a schematic perspective view illustrating an image blur correction device according to a second embodiment together with FIGS. 17 to 25.

Subsequently, a blur correction operation in the third direction (rolling direction) in the image blur correction device 10 will be described (refer to FIGS. 14 and 15).

In the image blur correction device 10, when the third driving shaft 29a of the third actuator 29 is moved diagonally upward right and thereby the third driving portion 30 is moved diagonally upward right, the third driven portion 16 is moved in accordance with the movement of the third driving portion 30. Thereby, the lens unit 11 is rotated in the third direction about the third fulcrum axis S3 as a fulcrum such that the photography lens 13 is slightly moved diagonally upward right (refer to FIG. 14).

At this time, the first driven portion 14 comes into contact with the first driving portion 26 of the first actuator 25. However, in accordance with the rotation of the lens unit 11 in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11 in the third direction, a condition of contact between the second driving portion 28 and the second driven portion 15 is slightly changed.

When the lens unit 11 is rotated in the third direction in such a manner, in accordance with the rotation of the lens unit 11, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11 from the first driving portion 26 and the second driving portion 28. Accordingly, the lens unit 11 is smoothly rotated in the third direction.

On the other hand, in the image blur correction device 10, when the third driving shaft 29a of the third actuator 29 is moved diagonally downward left and thereby the third driving portion 30 is moved diagonally downward left, the third driven portion 16 is moved in accordance with the movement of the third driving portion 30. Thereby, the lens unit 11 is rotated in the third direction about the third fulcrum axis S3 as a fulcrum such that the photography lens 13 is slightly moved diagonally downward left (refer to FIG. 15).

At this time, the first driven portion 14 comes into contact with the first driving portion 26 of the first actuator 25. However, in accordance with the rotation of the lens unit 11 in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11 in the third direction, a condition of contact between the second driving portion 28 and the second driven portion 15 is slightly changed.

When the lens unit 11 is rotated in the third direction in such a manner, in accordance with the rotation of the lens unit 11, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11 from the first driving portion 26 and the second driving portion 28. Accordingly, the lens unit 11 is smoothly rotated in the third direction.

In addition, in the image blur correction device 10, although not shown in the drawing, the lens unit 11 is configured to be rotatable in the second direction in a state where the lens unit 11 is rotated in the first direction from the reference position, and the lens unit 11 is configured to be rotatable in the first direction in a state where the lens unit 11 is rotated in the second direction from the reference position.

Further, in the image blur correction device 10, although not shown in the drawing, the lens unit 11 is configured to be rotatable in the third direction in a state where the lens unit 11 is rotated in the first direction from the reference position, and the lens unit 11 is configured to be rotatable in the first direction in a state where the lens unit 11 is rotated in the third direction from the reference position.

Furthermore, in the image blur correction device 10, although not shown in the drawing, the lens unit 11 is configured to be rotatable in the third direction in a state where the lens unit 11 is rotated in the second direction from the reference position, and the lens unit 11 is configured to be rotatable in the second direction in a state where the lens unit 11 is rotated in the third direction from the reference position.

Configuration (Second Embodiment) of Image Blur Correction Device

Next, a configuration of an image blur correction device 10A according to a second embodiment will be described (refer to FIGS. 16 to 19).

In addition, the image blur correction device 10A to be described later is different, compared with the image blur correction device 10 according to the first embodiment, in that the positions of the respective portions, such as the driving portion and the driven portion, provided in the lens unit or the fixing member are different. Accordingly, in the image blur correction device 10A, compared with the image blur correction device 10, different parts will be described in detail, the other parts will be represented by numerals and signs the same as the numerals and signs used in the image blur correction device 10, and the description thereof will be omitted.

The image blur correction device 10A has a lens unit 11A and a fixing member 12A that supports the lens unit 11A.

The lens unit 11A has the first driven portion 14 that protrudes leftward from the central portion of the lower surface in the horizontal direction, a second driven portion 15 that protrudes rightward from the central portion of the right side surface in the vertical direction, and a third driven portion 16 that protrudes diagonally downward right from the right end portion on the lower surface. The first driven portion 14 and the second driven portion 15 are bent in, for example, L-shapes, and the leading end surfaces thereof are formed to be rounded.

A bearing portion 33, which is open toward the back side, is formed at the central portion of the back side of the base surface portion 20A of the lens unit 11A.

The base end portions of the first driven portion 14 and the second driven portion 15 of the lens unit 11A respectively function as the first spring latch portion 18 and the second spring latch portion 19.

The fixing member 12A includes: a base surface portion 20A that faces the front and back sides; a first holding portion 21 that extends to the central portion of the lower end portion of the base surface portion 20A in the horizontal direction; a second holding portion 22 that extends to the central portion of the right end portion of the base surface portion 20A in the vertical direction; and a third holding portion 23 that extends to the lower right end portion of the base surface portion 20A. The fixing member 12A is fixed inside the lens unit 11A.

A fulcrum portion 34, which protrudes frontward, is provided at the central portion on the base surface portion 20A of the fixing member 12A, and a tip portion of the fulcrum portion 34 is provided as a spherical portion 34a.

The spherical portion 34a of the fulcrum portion 34 is supported by the bearing portion 33 of the lens unit 11A to be rotatable in an arbitrary direction. Accordingly, the lens unit 11A is configured to be rotatable in the arbitrary direction by using the spherical portion 34a as a fulcrum relative to the fixing member 12A.

In the above description of the example, the bearing portion 33, which is concave, is provided on the lens unit 11A, and the fulcrum portion 34, which is inserted into the bearing portion 33, is provided on the fixing member 12A. However, on the contrary, it may be possible to adopt the following configuration: the bearing portion is provided on the fixing member, and the fulcrum portion, which is inserted into the bearing portion, is provided on the lens unit.

The first bias spring 31 is supported between the first spring latch portion 18 of the lens unit 11A and the fixing member 12A. Accordingly, the lens unit 11A is urged backward by the first bias spring 31, and thus the first driven portion 14 is pressed against the first operating surface 26a of the first driving portion 26.

The second bias spring 32 is supported between the second spring latch portion 19 of the lens unit 11A and the fixing member 12A. Accordingly, the lens unit 11A is urged backward by the second bias spring 32, and thus the second driven portion 15 is pressed against the second operating surface 28a of the second driving portion 28.

The lens unit 11A is configured to be rotatable in a first direction (pitching direction), which is an axial rotation direction of a first fulcrum axis S1, relative to the fixing member 12A. Further, the lens unit 11A is configured to be rotatable in a second direction (yawing direction), which is an axial rotation direction of a second fulcrum axis S2, relative to the fixing member 12A. Furthermore, the lens unit 11A is configured to be rotatable in a third direction (rolling direction), which is an axial rotation direction of a third fulcrum axis S3, relative to the fixing member 12A.

The first fulcrum axis S1, the second fulcrum axis S2, and the third fulcrum axis S3 are orthogonal to one another. For example, the first fulcrum axis S1 and the second fulcrum axis S2 are positioned on the same plane orthogonal to an optical axis P. The first fulcrum axis S1, which is set as a rotation axis in the pitching direction, is positioned on the line connecting the spherical portion 34a of the fulcrum portion 34 and the second driving portion 28. The second fulcrum axis S2, which is set as a rotation axis in the yawing direction, is positioned on the line connecting the spherical portion 34a of the fulcrum portion 34 and the first driving portion 26. Both of the first fulcrum axis S1 and the second fulcrum axis S2 are set as intersection lines of the optical axis P. The third fulcrum axis S3, which is set as a rotation axis in the rolling direction, is positioned on the line parallel with the optical axis P passing through the spherical portion 34a of the fulcrum portion 34.

In the image blur correction device 10A, at least one of the respective axes of the first fulcrum axis S1 and the second fulcrum axis S2 may be positioned on either one of the respective lines of the line connecting the fulcrum portion 34 and the second driving portion 28 or the line connecting the fulcrum portion 34 and the first driving portion 26.

Further, in the above description of the example, the first direction, the second direction, and the third direction are respectively set as the pitching direction, the yawing direction, and the rolling direction. However, each of the first direction, the second direction, and the third direction may be set as any of the pitching direction, the yawing direction, and the rolling direction.

Operation (Second Embodiment) of Image Blur Correction Device

Hereinafter, a blur correction operation in the image blur correction device 10A will be described (refer to FIGS. 17 to 25).

Figure 17:
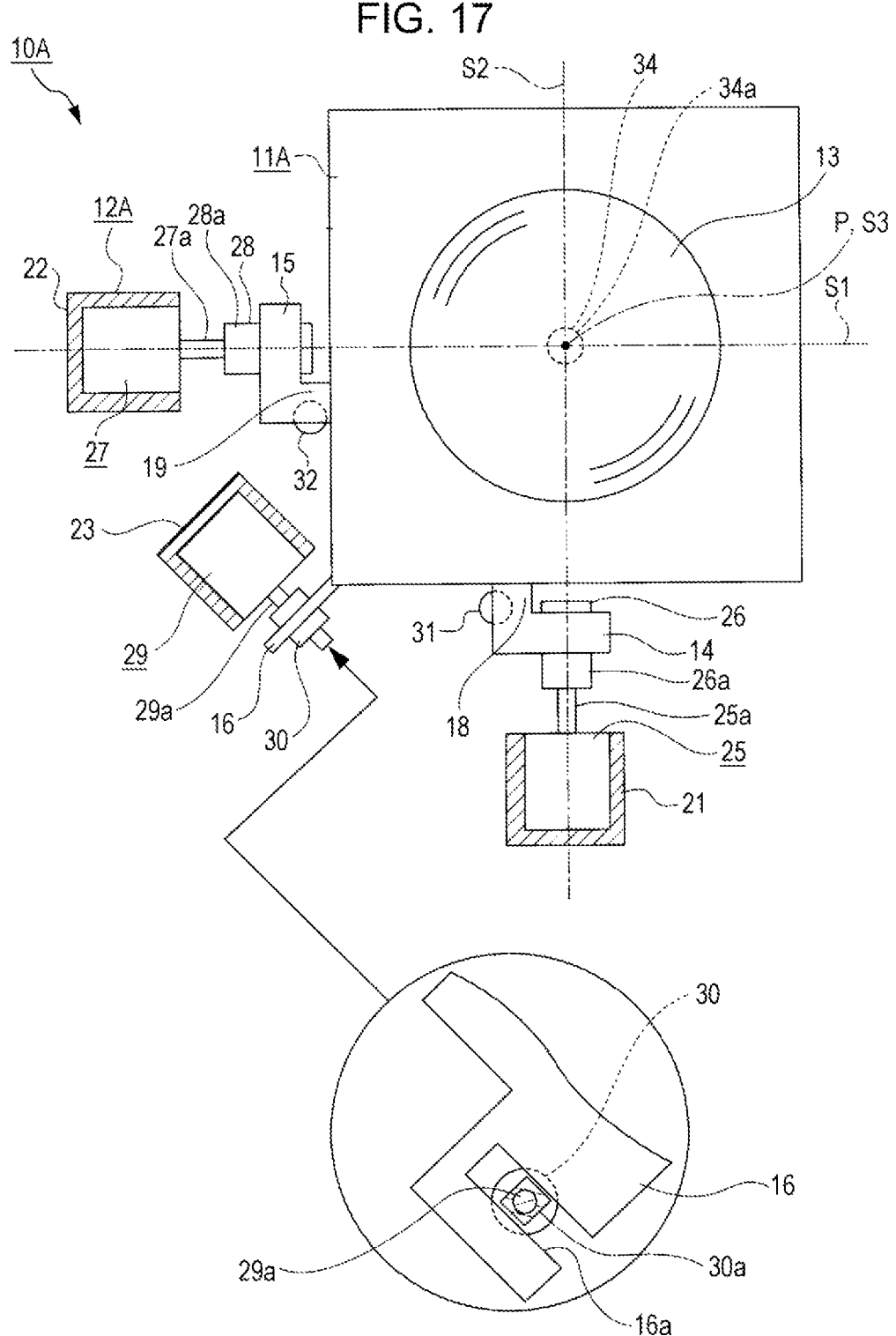
FIG. 17 is a schematic front view of the image blur correction device.
Figure 18:
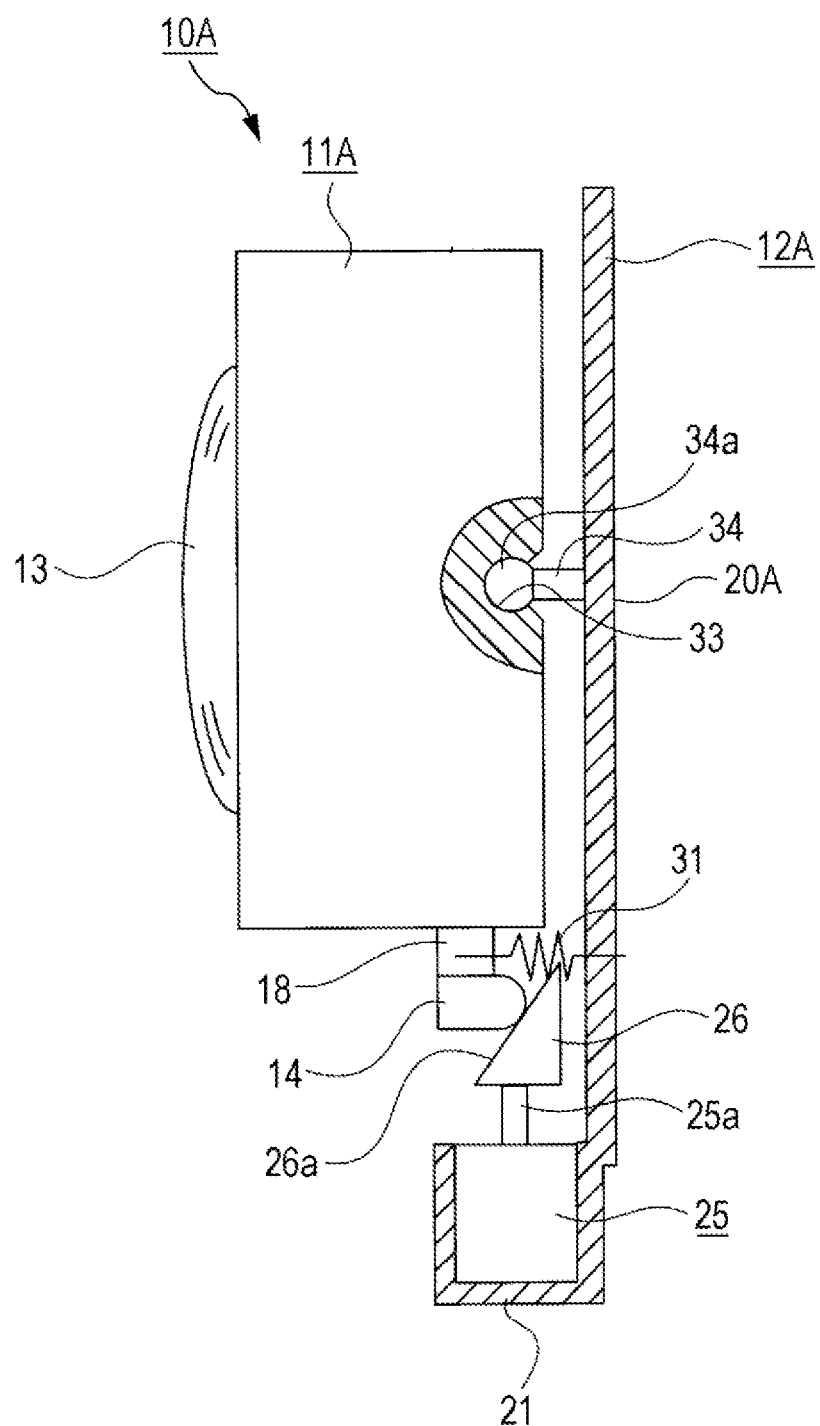
FIG. 18 is a schematic side view of the image blur correction device.
Figure 19:
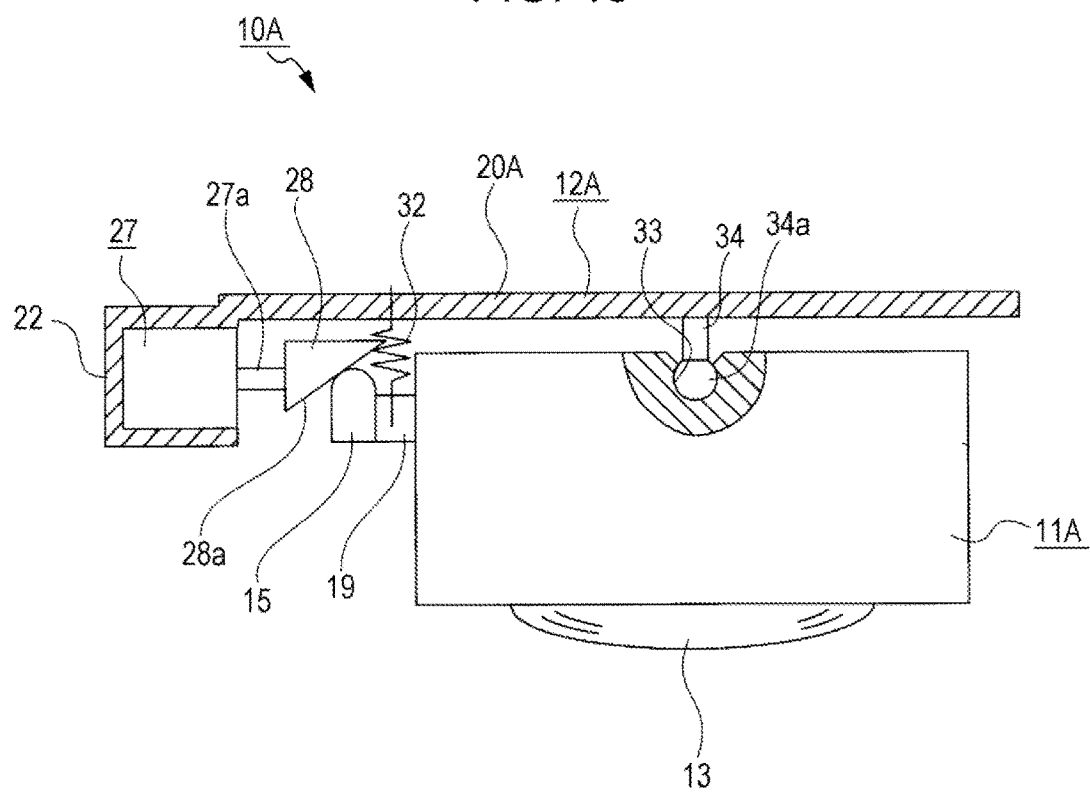
FIG. 19 is a schematic top plan view of the image blur correction device.

In a state where the blur correction operation is not performed, the image blur correction device 10A is at a reference position at which the lens unit 11A is not rotated in any one direction of the first direction, the second direction, and the third direction (refer to FIGS. 17 to 19).

Figure 20:
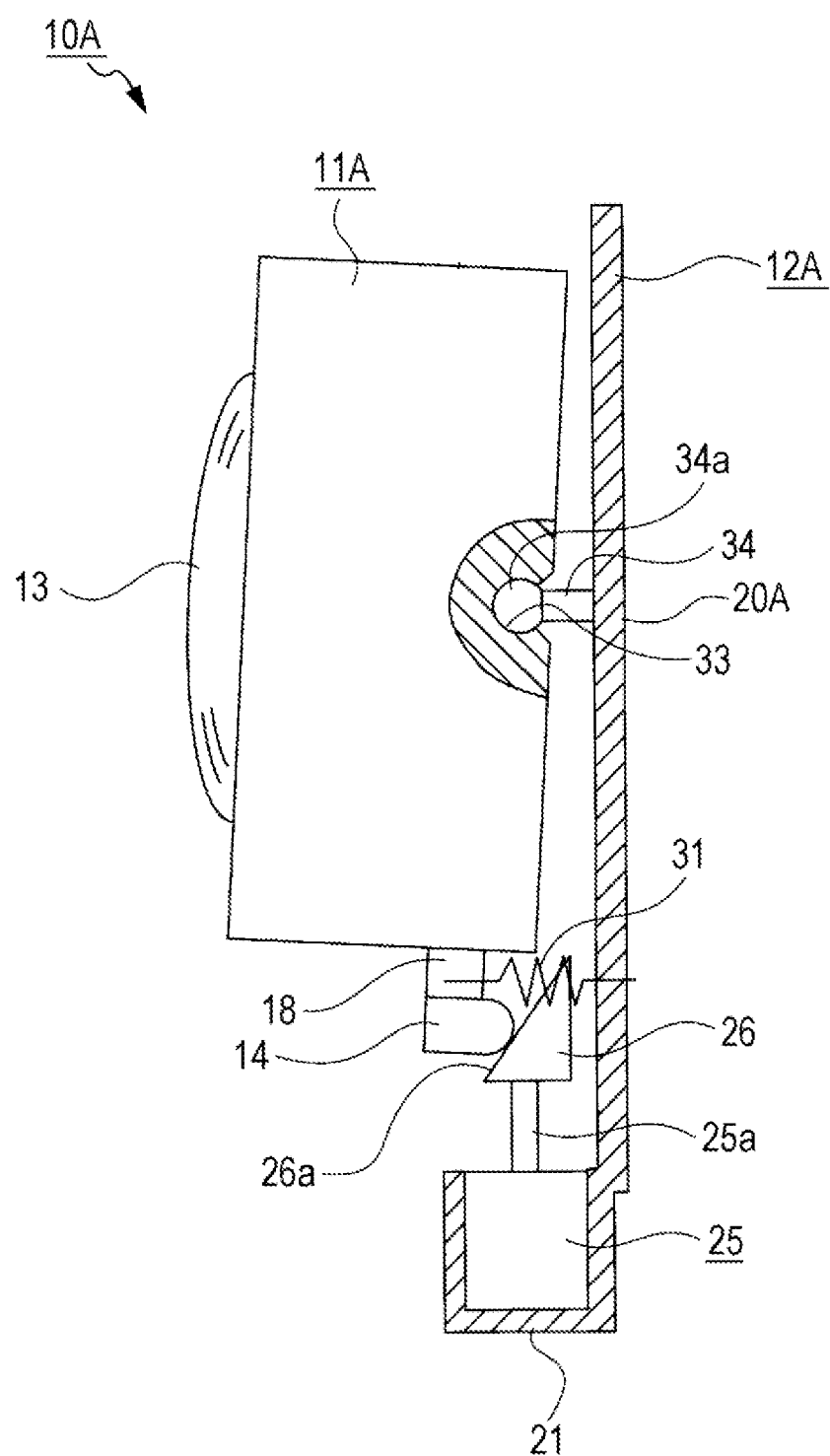
FIG. 20 is a schematic side view illustrating an operation of the image blur correction device in a condition where the lens unit is rotated toward one side in the first direction together with FIGS. 21 to 25.
Figure 21:
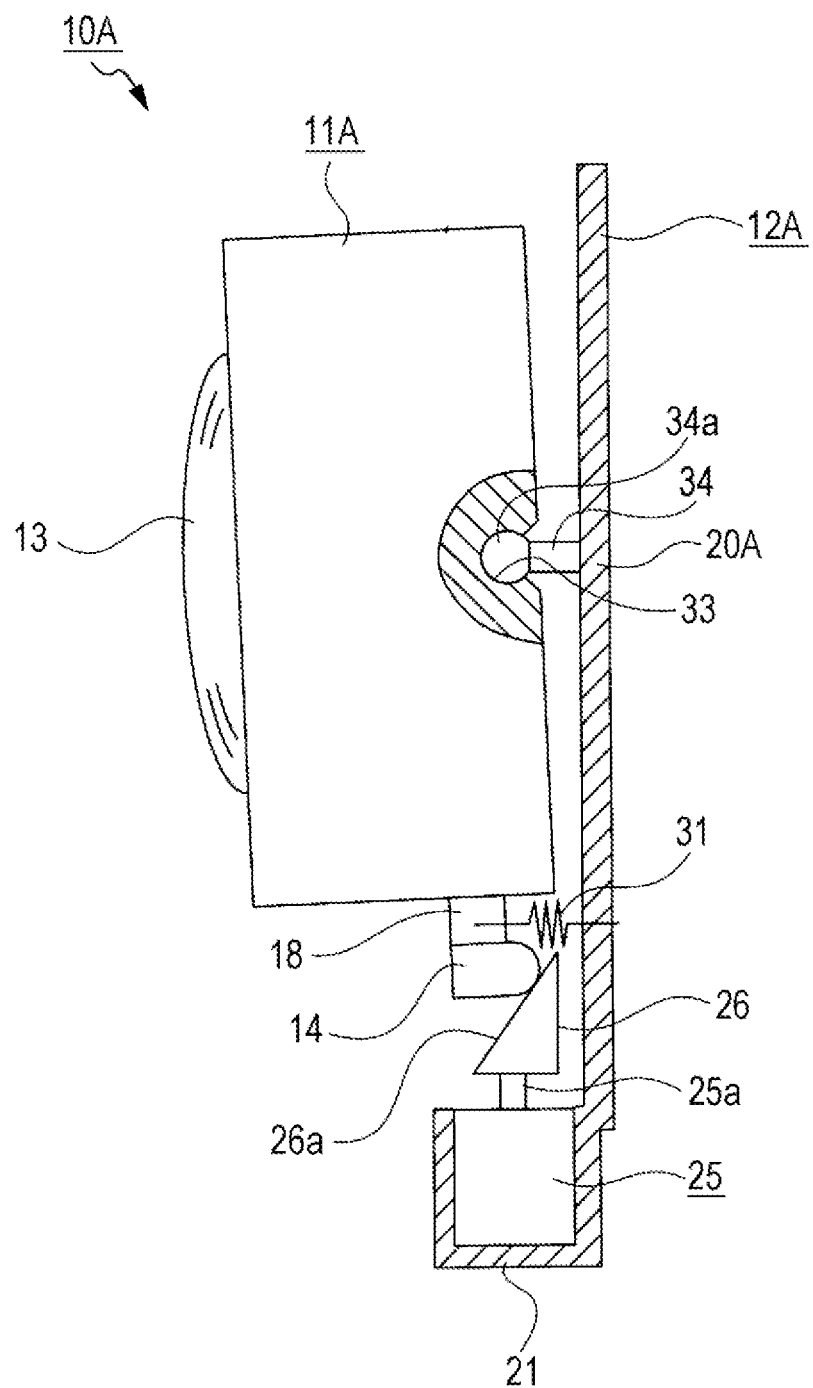
FIG. 21 is a schematic side view illustrating a condition where the lens unit is rotated toward the other side in the first direction.

First, a blur correction operation in the first direction (pitching direction) in the image blur correction device 10A will be described (refer to FIGS. 20 to 21).

In the image blur correction device 10A, when the first driving shaft 25a of the first actuator 25 is moved upward and thereby the first driving portion 26 is moved upward, the first operating surface 26a slides on the first driven portion 14. Thereby, the lens unit 11A is rotated about the first fulcrum axis S1 as a fulcrum in the first direction in which the photography lens 13 faces slightly upward against an elastic force of the first bias spring 31 (refer to FIG. 20).

At this time, the second driven portion 15 comes into contact with the second driving portion 28 of the second actuator 27. However, in accordance with the rotation of the lens unit 11A in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11A in the first direction, and the engagement position of the supporting hole 16a is changed.

When the lens unit 11A is rotated in the first direction in such a manner, in accordance with the rotation of the lens unit 11A, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11A from the second driving portion 28 and the third driving portion 30. Accordingly, the lens unit 11A is smoothly rotated in the first direction.

On the other hand, in the image blur correction device 10A, when the first driving shaft 25a of the first actuator 25 is moved downward and thereby the first driving portion 26 is moved downward, the first operating surface 26a slides on the first driven portion 14. Thereby, the lens unit 11A is rotated about the first fulcrum axis S1 as a fulcrum in the first direction in which the photography lens 13 faces slightly downward due to the elastic force of the first bias spring 31 (refer to FIG. 21).

At this time, the second driven portion 15 comes into contact with the second driving portion 28 of the second actuator 27. However, in accordance with the rotation of the lens unit 11A in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11A in the first direction, and the engagement position of the supporting hole 16a is changed.

When the lens unit 11A is rotated in the first direction in such a manner, in accordance with the rotation of the lens unit 11A, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11A from the second driving portion 28 and the third driving portion 30. Accordingly, the lens unit 11A is smoothly rotated in the first direction.

Figure 22:
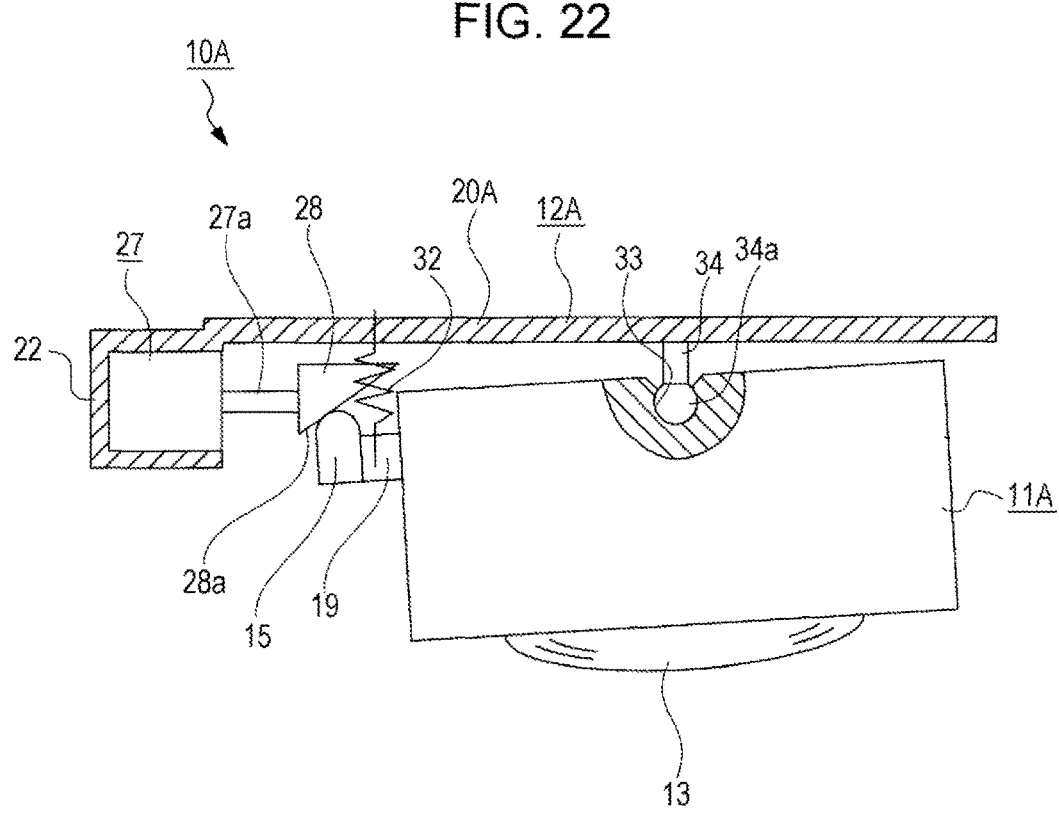
FIG. 22 is a schematic top plan view illustrating a condition where the lens unit is rotated toward one side in the second direction.
Figure 23:
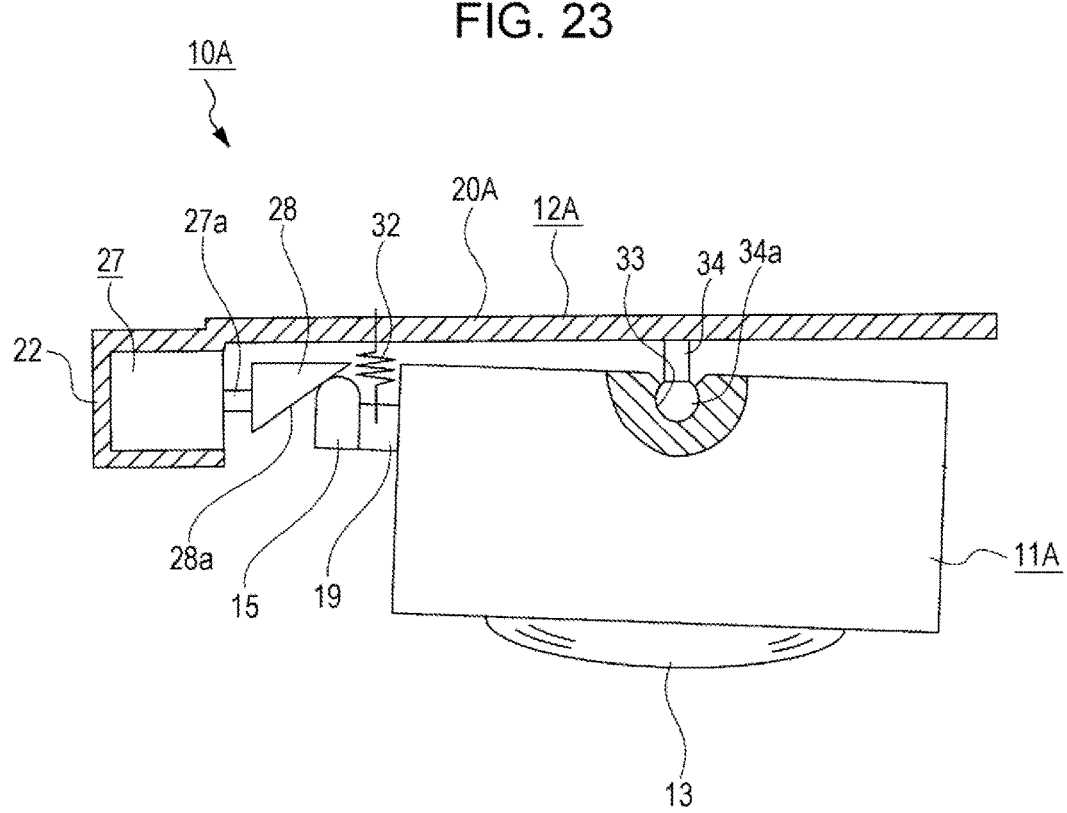
FIG. 23 is a schematic top plan view illustrating a condition where the lens unit is rotated toward the other side in the second direction.

Next, a blur correction operation in the second direction (yawing direction) in the image blur correction device 10A will be described (refer to FIGS. 22 to 23).

In the image blur correction device 10A, when the second driving shaft 27a of the second actuator 27 is moved leftward and thereby the second driving portion 28 is moved leftward, the second operating surface 28a slides on the second driven portion 15. Thereby, the lens unit 11A is rotated about the second fulcrum axis S2 as a fulcrum in the second direction in which the photography lens 13 faces slightly leftward against an elastic force of the second bias spring 32 (refer to FIG. 22).

At this time, the first driven portion 14 comes into contact with the first driving portion 26 of the first actuator 25. However, in accordance with the rotation of the lens unit 11A in the second direction, a condition of contact between the first driving portion 26 and the first driven portion 14 is slightly changed.

Simultaneously, the third driving portion 30 of the third actuator 29 slides on the third driven portion 16 in accordance with the rotation of the lens unit 11A in the second direction, and the engagement position of the supporting hole 16a is changed.

When the lens unit 11A is rotated in the second direction in such a manner, in accordance with the rotation of the lens unit 11A, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11A from the first driving portion 26 and the third driving portion 30. Accordingly, the lens unit 11A is smoothly rotated in the second direction.

On the other hand, in the image blur correction device 10A, when the second driving shaft 27a of the second actuator 27 is moved rightward and thereby the second driving portion 28 is moved rightward, the second operating surface 28a slides on the second driven portion 15. Thereby, the lens unit 11A is rotated about the second fulcrum axis S2 as a fulcrum in the second direction in which the photography lens 13 faces slightly rightward due to the elastic force of the second bias spring 32 (refer to FIG. 23).

At this time, the first driven portion 14 comes into contact with the first driving portion 26 of the first actuator 25. However, in accordance with the rotation of the lens unit 11A in the second direction, the condition of contact between the first driving portion 26 and the first driven portion 14 is slightly changed.

Simultaneously, the third driving portion 30 of the third actuator 29 slides on the third driven portion 16 in accordance with the rotation of the lens unit 11A in the second direction, and the engagement position of the supporting hole 16a is changed.

When the lens unit 11A is rotated in the second direction in such a manner, in accordance with the rotation of the lens unit 11A, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11A from the first driving portion 26 and the third driving portion 30. Accordingly, the lens unit 11A is smoothly rotated in the second direction.

Figure 24:
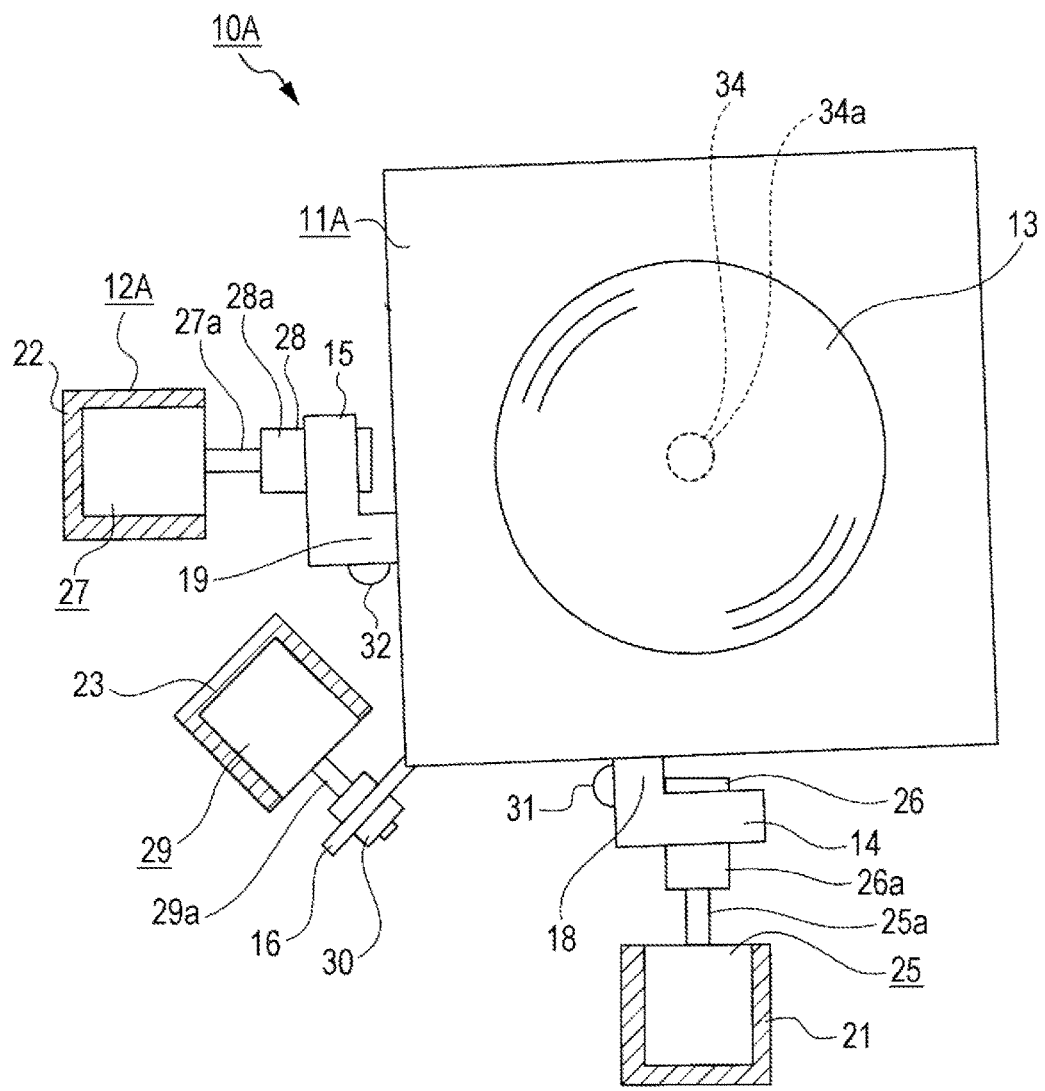
FIG. 24 is a schematic front view illustrating a condition where the lens unit is rotated toward one side in the third direction.
Figure 25:
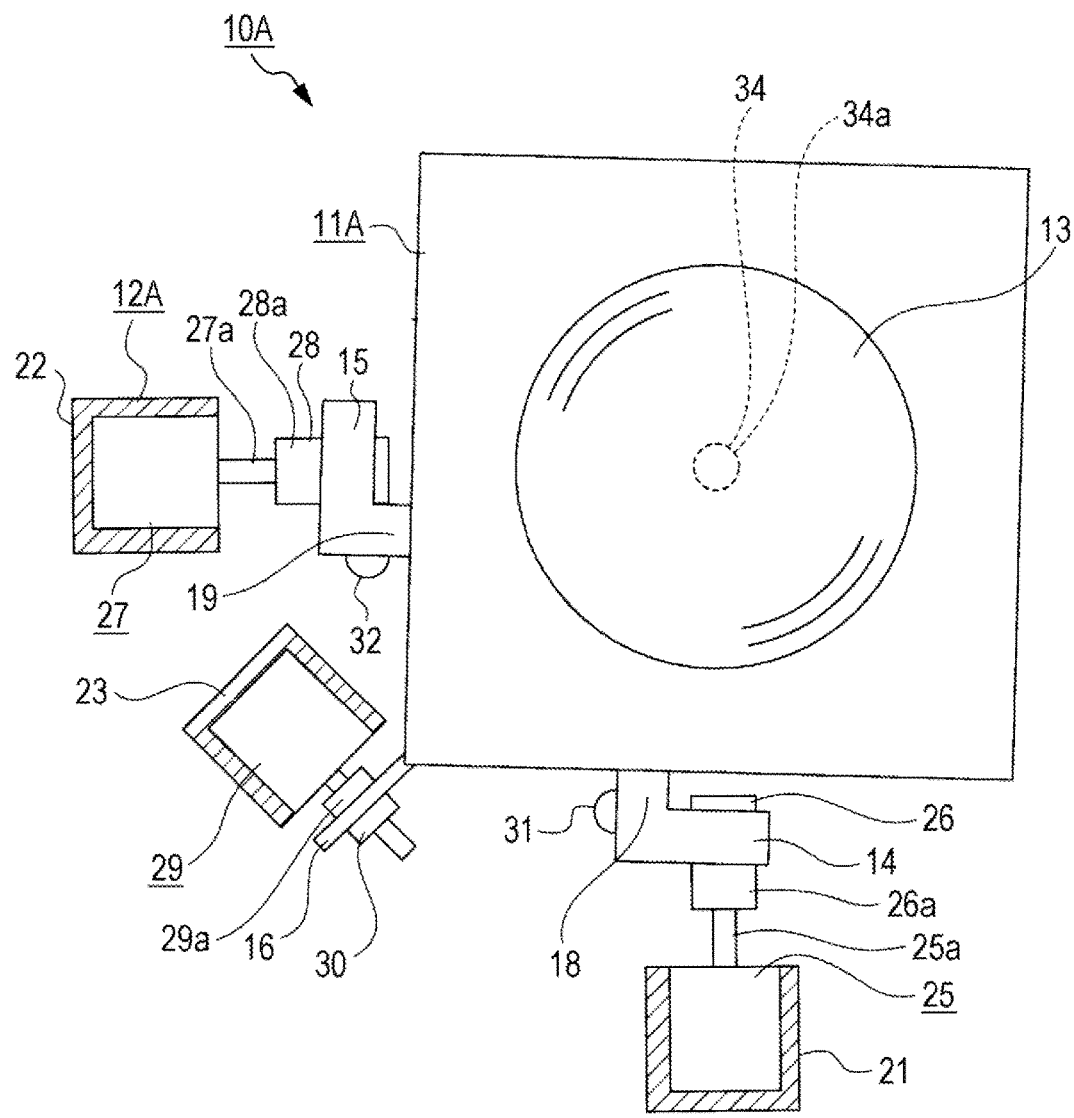
FIG. 25 is a schematic front view illustrating a condition where the lens unit is rotated toward the other side in the third direction.

Subsequently, a blur correction operation in the third direction (rolling direction) in the image blur correction device 10A will be described (refer to FIGS. 24 and 25).

In the image blur correction device 10A, when the third driving shaft 29a of the third actuator 29 is moved diagonally upward right and thereby the third driving portion 30 is moved diagonally upward right, the third driven portion 16 is moved in accordance with the movement of the third driving portion 30. Thereby, the lens unit 11A is rotated in the third direction about the third fulcrum axis S3 as a fulcrum such that the photography lens 13 is slightly moved diagonally upward right (refer to FIG. 24).

At this time, the first driven portion 14 comes into contact with the first driving portion 26 of the first actuator 25. However, in accordance with the rotation of the lens unit 11A in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11A in the third direction, a condition of contact between the second driving portion 28 and the second driven portion 15 is slightly changed.

When the lens unit 11A is rotated in the third direction in such a manner, in accordance with the rotation of the lens unit 11A, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11A from the first driving portion 26 and the second driving portion 28. Accordingly, the lens unit 11A is smoothly rotated in the third direction.

On the other hand, in the image blur correction device 10A, when the third driving shaft 29a of the third actuator 29 is moved diagonally downward left and thereby the third driving portion 30 is moved diagonally downward left, the third driven portion 16 is moved in accordance with the movement of the third driving portion 30. Thereby, the lens unit 11A is rotated in the third direction about the third fulcrum axis S3 as a fulcrum such that the photography lens 13 is slightly moved diagonally downward left (refer to FIG. 25).

At this time, the first driven portion 14 comes into contact with the first driving portion 26 of the first actuator 25. However, in accordance with the rotation of the lens unit 11A in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11A in the third direction, a condition of contact between the second driving portion 28 and the second driven portion 15 is slightly changed.

When the lens unit 11A is rotated in the third direction in such a manner, in accordance with the rotation of the lens unit 11A, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11A from the first driving portion 26 and the second driving portion 28. Accordingly, the lens unit 11A is smoothly rotated in the third direction.

As described above, in the image blur correction device 10A, the fulcrum portion 34 is positioned on the optical axis P. Hence, the lens unit 11A is rotated about the first fulcrum axis S1, the second fulcrum axis S2, or the third fulcrum axis S3, which passes through the optical axis P, as a fulcrum. Thus, an amount of rotation of the lens unit 11A is minimized, and it is possible to achieve reduction in the size and improve the accuracy in correction of the blur correction operation.

In addition, in the image blur correction device 10A, although not shown in the drawing, the lens unit 11A is configured to be rotatable in the second direction in a state where the lens unit 11A is rotated in the first direction from the reference position, and the lens unit 11A is configured to be rotatable in the first direction in a state where the lens unit 11A is rotated in the second direction from the reference position.

Further, in the image blur correction device 10A, although not shown in the drawing, the lens unit 11A is configured to be rotatable in the third direction in a state where the lens unit 11A is rotated in the first direction from the reference position, and the lens unit 11A is configured to be rotatable in the first direction in a state where the lens unit 11A is rotated in the third direction from the reference position.

Furthermore, in the image blur correction device 10A, although not shown in the drawing, the lens unit 11A is configured to be rotatable in the third direction in a state where the lens unit 11A is rotated in the second direction from the reference position, and the lens unit 11A is configured to be rotatable in the second direction in a state where the lens unit 11A is rotated in the third direction from the reference position.

As described above, in the image blur correction device 10 or 10A, the first fulcrum axis S1 is positioned on the line connecting the fulcrum portion 17 or 34 and the second driving portion 28, and the second fulcrum axis S2 is positioned on the line connecting the fulcrum portion 17 or 34 and the first driving portion 26.

Accordingly, the two gimbal mechanisms arranged in the optical axis direction are not configured such that the lens unit is rotated. Hence, it is possible to simplify the structure and achieve reduction in the size of the device.

Further, the first fulcrum axis S1 and the second fulcrum axis S2 are positioned to be coplanar. Hence, the lens unit 11 or 11A is rotated in the first and second directions respectively about the first fulcrum axis S1 and the second fulcrum axis S2, which are positioned to be coplanar, as fulcrums. As a result, it is possible to further achieve reduction in the size.

Furthermore, the lens unit 11 or 11A is rotated in the third direction about the third fulcrum axis S3 as a fulcrum. Hence, it is possible to improve functionality, and it is possible to simplify the structure and achieve reduction in the size of the device.

Moreover, in the configuration, the first driving portion 26 and the second driving portion 28 are moved, the position of contact between the first operating surface 26a and the first driven portion 14 and the position of contact the second operating surface 28a and the second driven portion 15 are changed, and the lens unit 11 or 11A is rotated. Hence, it is possible to simplify the structure of the driving mechanism, and it is possible to further simplify the structure of the device.

Further, the first operating surface 26a and the second operating surface 28a are formed to be coplanar. Hence, it is easy to form the first driving portion 26 and the second driving portion 28, and it is possible to form the image blur correction device 10 or 10A without an increase in manufacturing costs.

In addition, there are provided the first bias spring 31 and the second bias spring 32 that urge the lens unit 11 or 11A in a direction in which the first driven portion 14 and the second driven portion 15 are respectively pressed against the first operating surface 26a and the second operating surface 28a.

Accordingly, it is possible to secure the conditions of the contact between the first driven portion 14 and the first operating surface 26a and the contact between the second driven portion 15 and the second operating surface 28a, and thus it is possible to secure a smooth and precise rotation operation of the lens unit 11 or 11A.

MODIFIED EXAMPLES OF IMAGE BLUR CORRECTION DEVICE

Next, modified examples of the respective sections according to the first embodiment and the second embodiment will be described (refer to FIGS. 26 to 43).

First Modified Example

The first modified example describes a first driving portion 26A and a second driving portion 28A as the modified examples of the first driving portion 26 and the second driving portion 28 (refer to FIGS. 26 to 29). Since the configurations and the operations of the first driving portion 26A and the second driving portion 28A are the same, the first driving portion 26A as an example will be hereinafter described.

Figure 26:
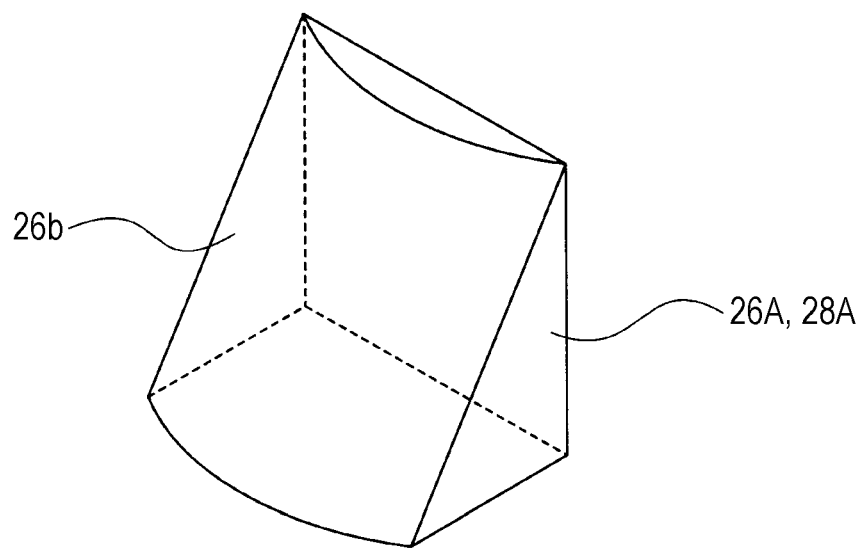
FIG. 26 is a schematic perspective view illustrating a first modified example together with FIGS. 27 to 29.
Figure 27:
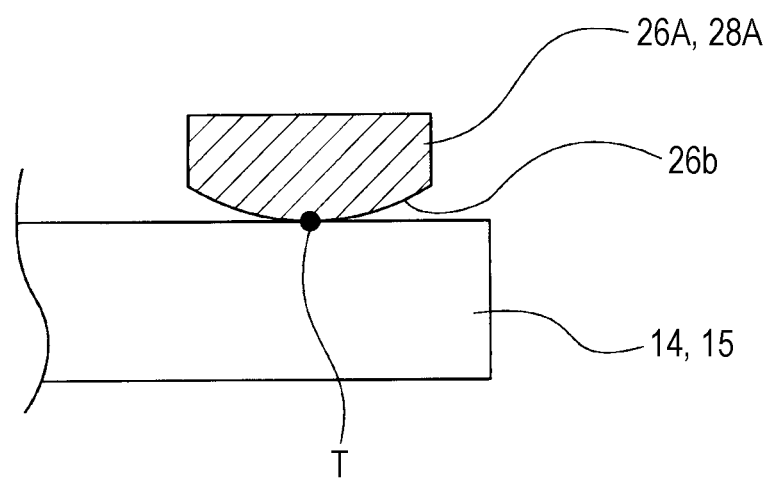
FIG. 27 is a schematic top plan view illustrating a condition where the lens unit is at a reference position before being rotated.

The first driving portion 26A has a first operating surface 26b that is formed in a curved shape which is convex toward the front side (refer to FIG. 26).

Figure 28:
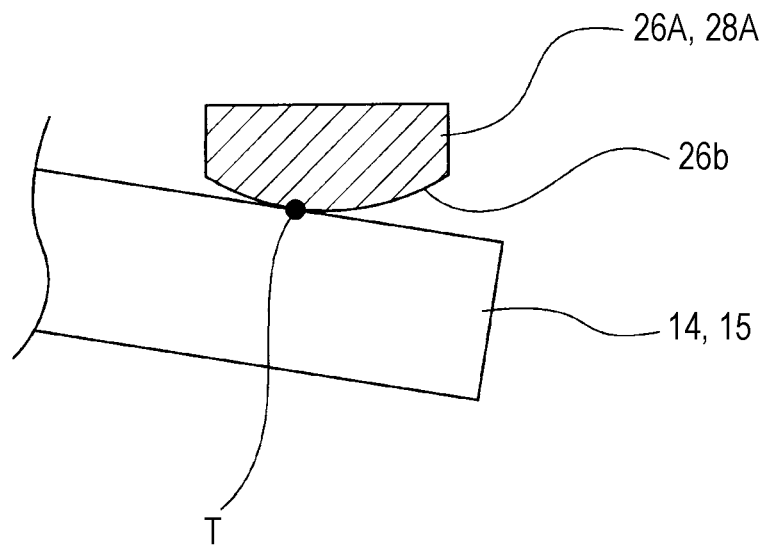
FIG. 28 is a schematic top plan view illustrating a condition where the lens unit is rotated.
Figure 29:
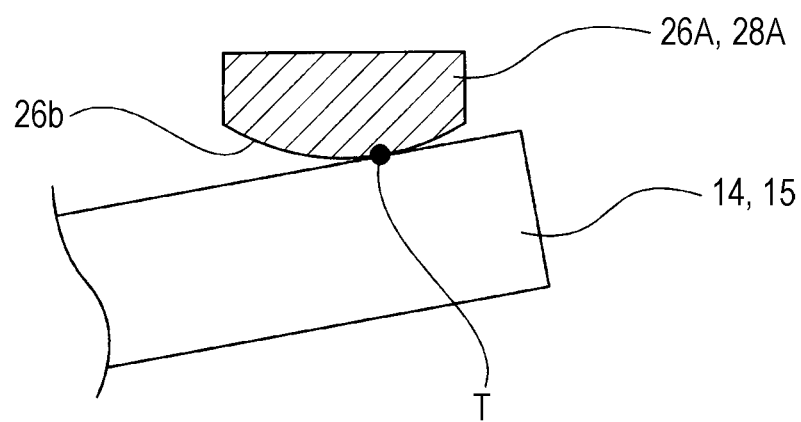
FIG. 29 is a schematic top plan view illustrating a different condition where the lens unit is rotated.

In a state where the first operating surface 26b of the first driving portion 26A comes into contact with the first driven portion 14 at the contact position T (refer to FIG. 27), when the lens unit 11 or 11A is rotated in the second direction and the third direction, an angle of the first driven portion 14 to the first operating surface 26b is changed (refer to FIGS. 28 and 29). In this case, since the first operating surface 26b is formed in a curved shape, when the angle of the first driven portion 14 to the first operating surface 26b is changed, the contact position T between both of them is not greatly changed.

Accordingly, when the lens unit 11 or 11A is rotated in a predetermined direction, positional deviation in other directions is small, and it is possible to improve the accuracy in correction of the blur correction operation.

Further, when the first operating surface 26b of the first driving portion 26A slides on the first driven portion 14 at the time of rotation of the lens unit 11 or 11A, the first operating surface 26b constantly comes into line contact or point contact with the first driven portion 14.

Accordingly, the load caused by the contact at the time of rotation of the lens unit 11 or 11A is small, and thus it is possible to secure a smooth rotation operation of the lens unit 11 or 11A.

Second Modified Example

The second modified example describes a first driving portion 26B and a second driving portion 28B as the modified examples of the first driving portion 26 and the second driving portion 28 (refer to FIGS. 30 to 33). Since the configurations and the operations of the first driving portion 26B and the second driving portion 28B are the same, the first driving portion 26B as an example will be hereinafter described.

Figure 30:
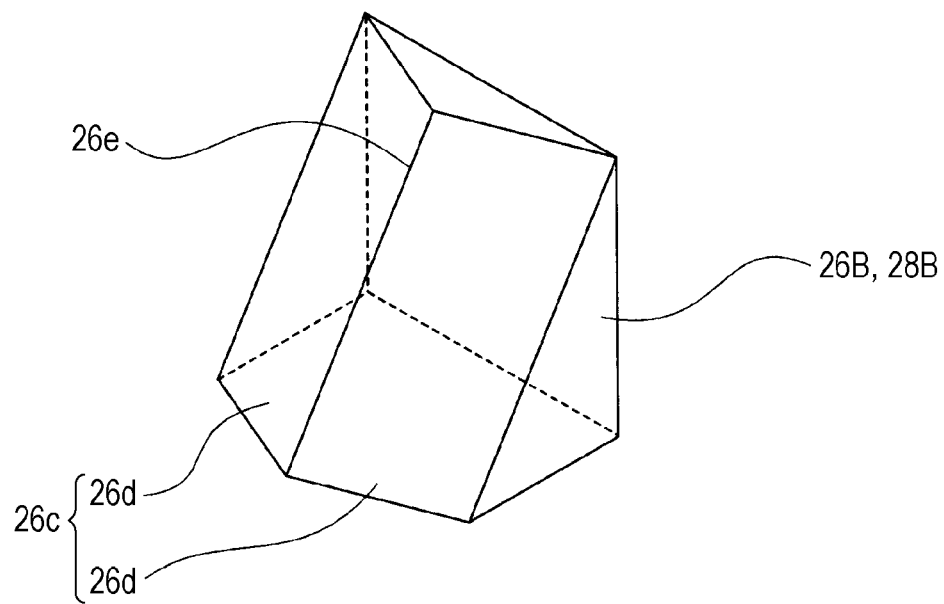
FIG. 30 is a schematic perspective view illustrating a second modified example together with FIGS. 31 to 33.
Figure 31:
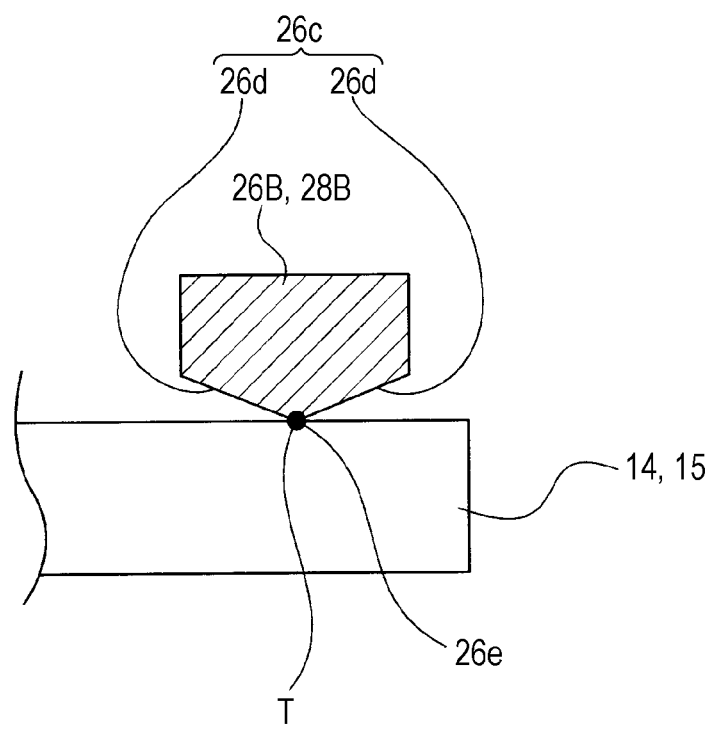
FIG. 31 is a schematic top plan view illustrating a condition where the lens unit is at a reference position before being rotated.

The first driving portion 26B is formed of two planar portions 26d and 26d which become close to each other as the first operating surface 26c moves forward, and the border line of the planar portions 26d and 26d is formed as an intersection line 26e (refer to FIG. 30).

Figure 32:
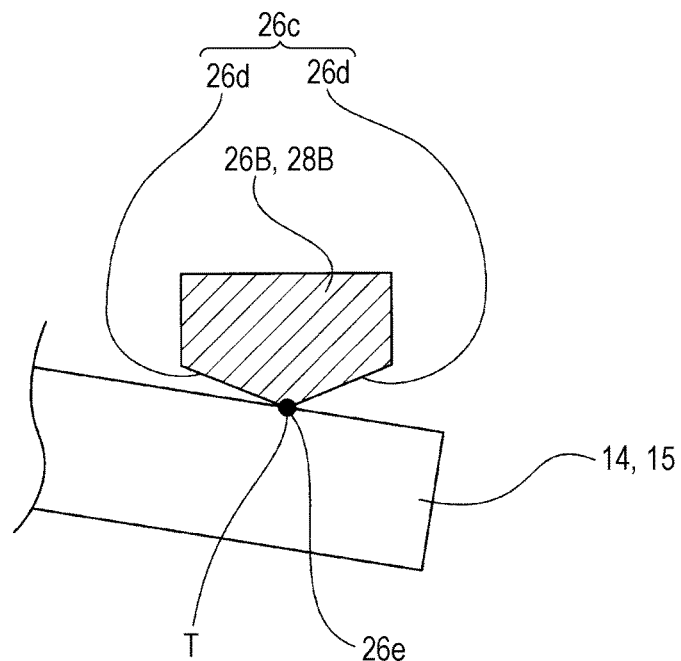
FIG. 32 is a schematic top plan view illustrating a condition where the lens unit is rotated.
Figure 33:
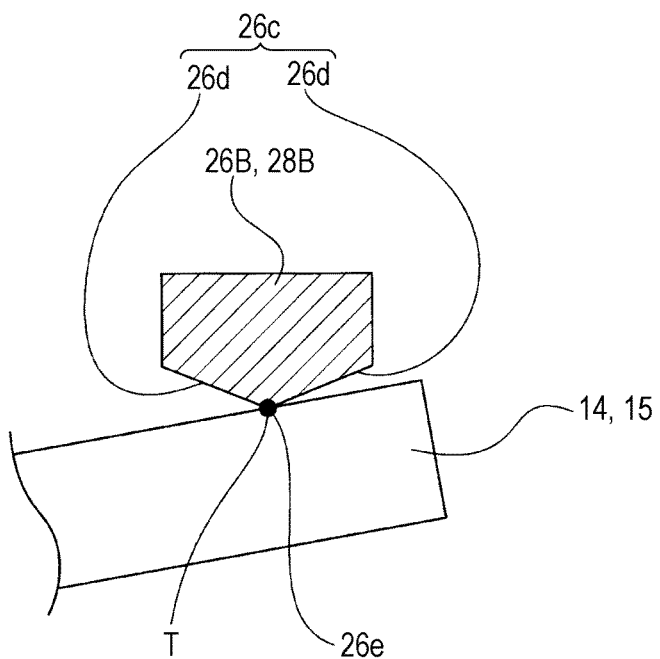
FIG. 33 is a schematic top plan view illustrating a different condition where the lens unit is rotated.

In a state where the first operating surface 26c of the first driving portion 26B comes into contact with the first driven portion 14 at the contact position T (refer to FIG. 31), when the lens unit 11 or 11A is rotated, the angle of the first driven portion 14 to the first operating surface 26c is changed (refer to FIGS. 32 and 33). In this case, since the first operating surface 26c is formed of planar portions 26d and 26d, when the angle of the first driven portion 14 to the first operating surface 26c is changed, the contact position T between both of them is constantly set as the intersection line 26e.

Accordingly, when the lens unit 11 or 11A is rotated in a predetermined direction, positional deviation in other directions is small, and it is possible to improve the accuracy in correction of the blur correction operation.

Further, when the first operating surface 26c of the first driving portion 26B slides on the first driven portion 14 at the time of rotation of the lens unit 11 or 11A, the intersection line 26e constantly comes into line contact or point contact with the first driven portion 14.

Accordingly, the load caused by the contact at the time of rotation of the lens unit 11 or 11A is small, and thus it is possible to secure a smooth rotation operation of the lens unit 11 or 11A.

Third Modified Example

Figure 34:
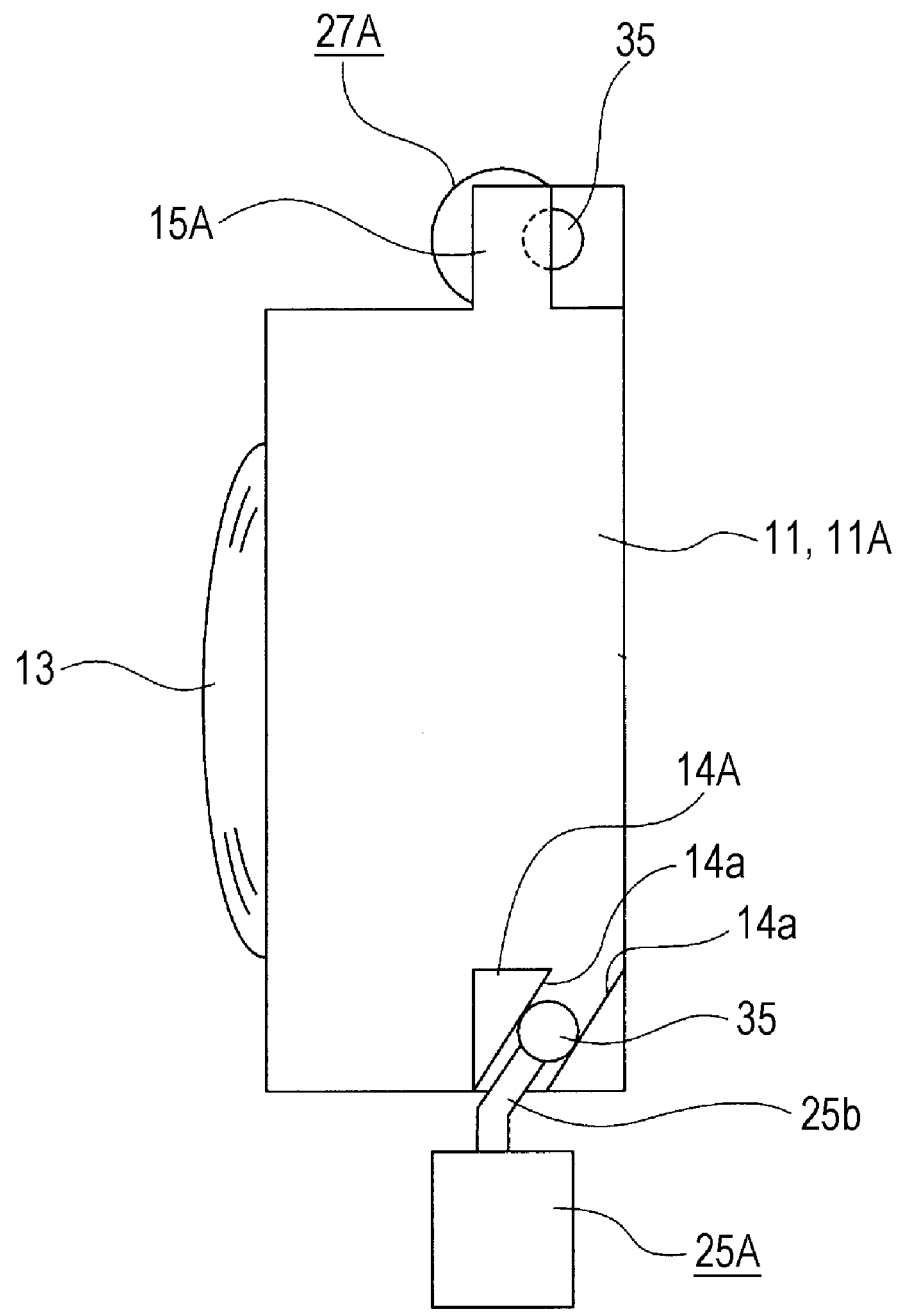
FIG. 34 is a schematic side view illustrating a third modified example together with FIG. 35.
Figure 35:
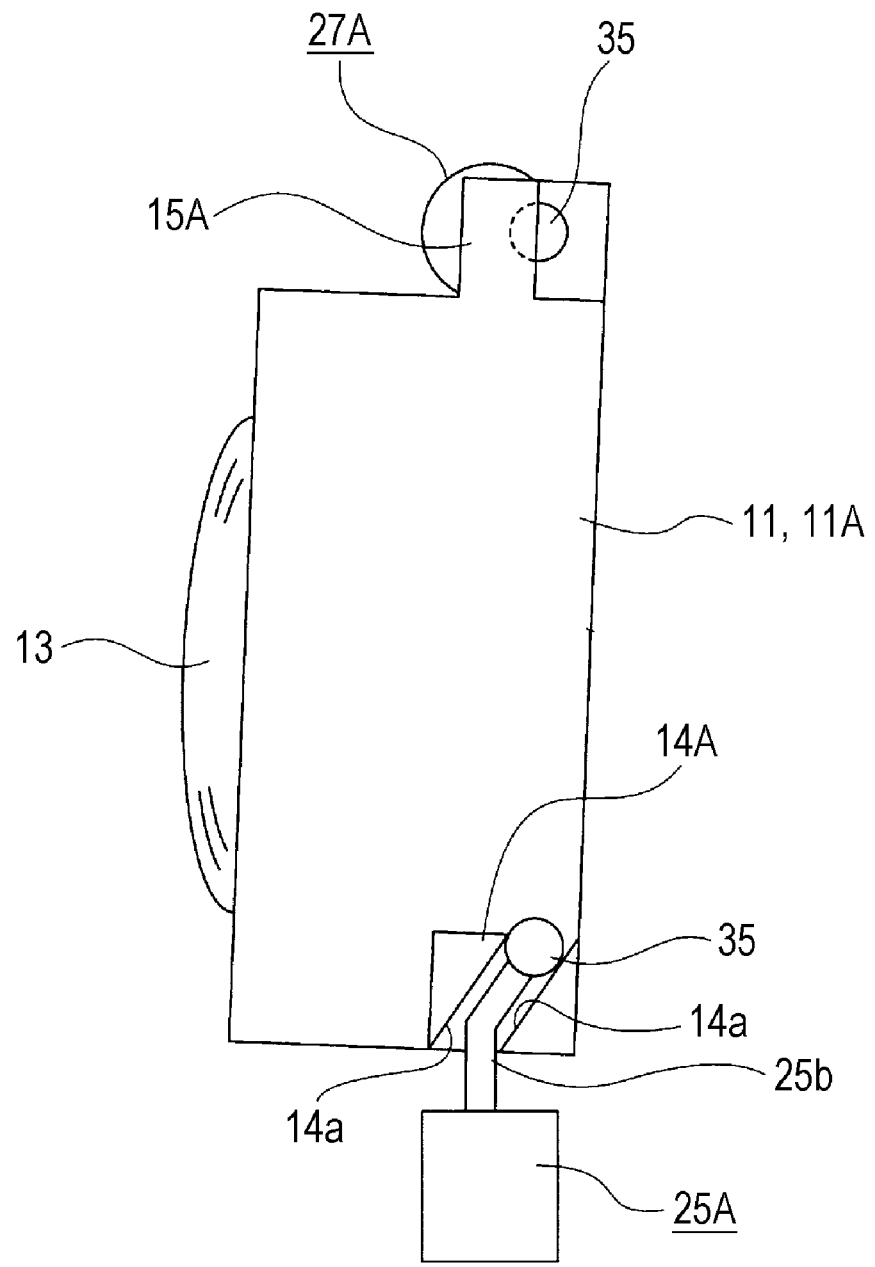
FIG. 35 is a schematic side view illustrating a condition where the lens unit is rotated.

The third modified example describes a first actuator 25A and a second actuator 27A as modified examples of the first actuator 25 and the second actuator 27 which rotate the lens unit 11 or 11A without using a bias spring (refer to FIGS. 34 and 35). Since the configurations and the operations of the first actuator 25A and the second actuator 27A are the same, the first actuator 25A as an example will be hereinafter described.

The first actuator 25A has a first driving shaft 25b which is bent, and a first driving portion 35 having a spherical shape is fixed onto the first driving shaft 25b (refer to FIG. 34).

The lens unit 11 or 11A is provided with a first driven portion 14A that protrudes laterally, and the first driven portion 14A has a pair of surfaces 14a and 14a to be operated. The surfaces 14a and 14a are positioned to be inclined in the vertical direction and to face each other.

The first driving portion 35 is inserted between the surfaces 14a and 14a to be operated, and slides on the first driven portion 14A.

When the first driving shaft 25b of the first actuator 25A is moved in the vertical direction and the first driving portion 35 is moved in the vertical direction, the first driving portion 35 slides on the first driven portion 14A. Thereby, the lens unit 11 or 11A is rotated about the first fulcrum axis S1 as a fulcrum in the first direction in which the photography lens 13 faces slightly upward or downward (refer to FIG. 35).

In such a manner, when the first actuator 25A is used, the first driving portion 35 is inserted and moved between the surfaces 14a and 14a to be operated, and the lens unit 11 or 11A is rotated. Hence, it is possible to smoothly rotate the lens unit 11 or 11A without using the bias spring. Accordingly, due to reduction in the number of components, it is possible to simplify the structure.

Further, since the first driving portion 35 is formed in a spherical shape, even when the lens unit 11 or 11A is rotated and inclined in the vertical direction or the horizontal direction, the distance between the surfaces 14a and 14a to be operated relative to the first driving portion 35 is not changed, and it is possible to smoothly rotate the lens unit 11 or 11A.

Fourth Modified Example

Figure 36:
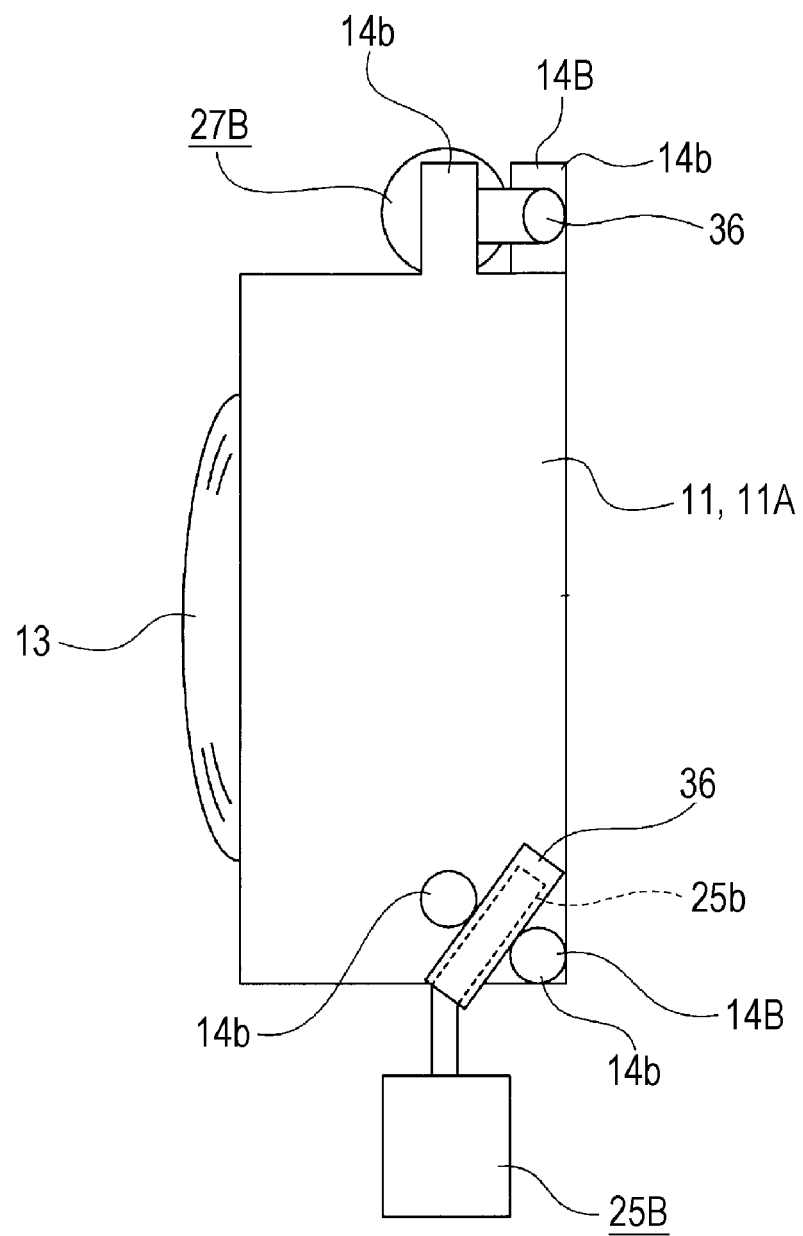
FIG. 36 is a schematic side view illustrating a fourth modified example together with FIG. 37.
Figure 37:
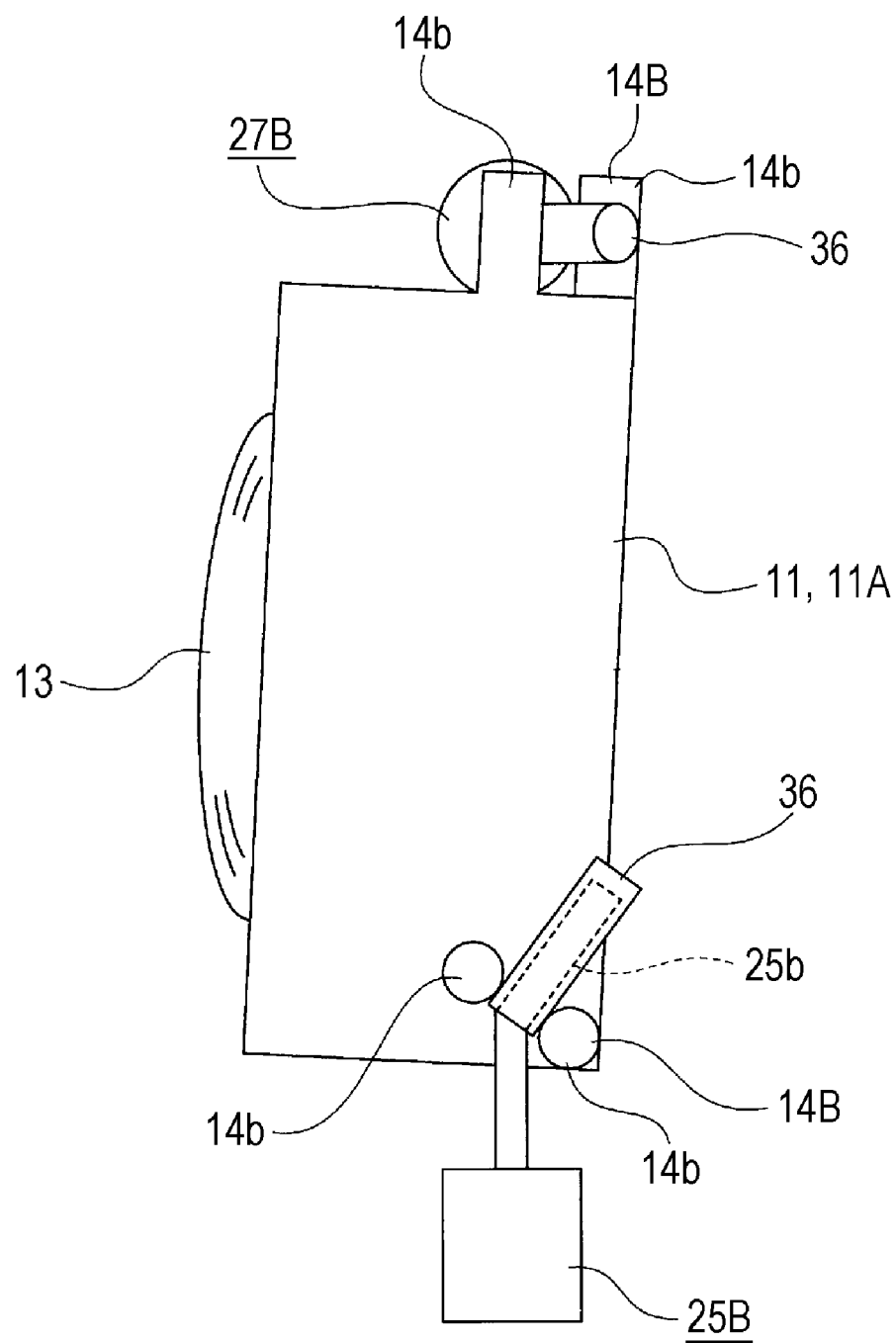
FIG. 37 is a schematic side view illustrating a condition where the lens unit is rotated.

The fourth modified example describes a first actuator 25B and a second actuator 27B as modified examples of the first actuator 25 and the second actuator 27 which rotate the lens unit 11 or 11A without using a bias spring (refer to FIGS. 36 and 37). Since the configurations and the operations of the first actuator 25B and the second actuator 27B are the same, the first actuator 25B as an example will be hereinafter described.

The first actuator 25B has a first driving shaft 25b which is bent, and a first driving portion 36 having a cylindrical shape is fixed onto the first driving shaft 25b (refer to FIG. 36). The axial direction of the first driving portion 36 is set as a direction which is oblique to the vertical direction.

The lens unit 11 or 11A is provided with a first driven portion 14B that protrudes laterally, and the first driven portion 14B is formed in a round shank shape, and is formed of a pair of shafts 14b and 14b to be operated. The shafts 14b and 14b are positioned to be separated in the front-back direction. The shafts 14b and 14b to be operated are positioned such that the front side shaft 14b to be operated is higher than the rear side shaft 14b to be operated.

The first driving portion 36 is inserted between the shafts 14b and 14b to be operated, and slides on the first driven portion 14B.

When the first driving shaft 25b of the first actuator 25B is moved in the vertical direction and the first driving portion 36 is moved in the vertical direction, the first driving portion 36 slides on the first driven portion 14B. Thereby, the lens unit 11 or 11A is rotated about the first fulcrum axis S1 as a fulcrum in the first direction in which the photography lens 13 faces slightly upward or downward (refer to FIG. 37).

In such a manner, when the first actuator 25B is used, the first driving portion 36 is inserted and moved between the shafts 14b and 14b to be operated, and the lens unit 11 or 11A is rotated. Hence, it is possible to smoothly rotate the lens unit 11 or 11A without using the bias spring. Accordingly, due to reduction in the number of components, it is possible to simplify the structure.

Fifth Modified Example

The fifth modified example describes a first driving portion 26C and a second driving portion 28C and a first driven portion 14C and a second driven portion 15C as modified examples of the first driving portion 26 and the second driving portion 28 and the first driven portion 14 and the second driven portion 15 (refer to FIGS. 38 to 41). Since the configurations and the operations of the first driving portion 26C and the second driving portion 28C and the first driven portion 14C and the second driven portion 15C are the same, the first driving portion 26C and the first driven portion 14C as examples will be hereinafter described.

Figure 38:
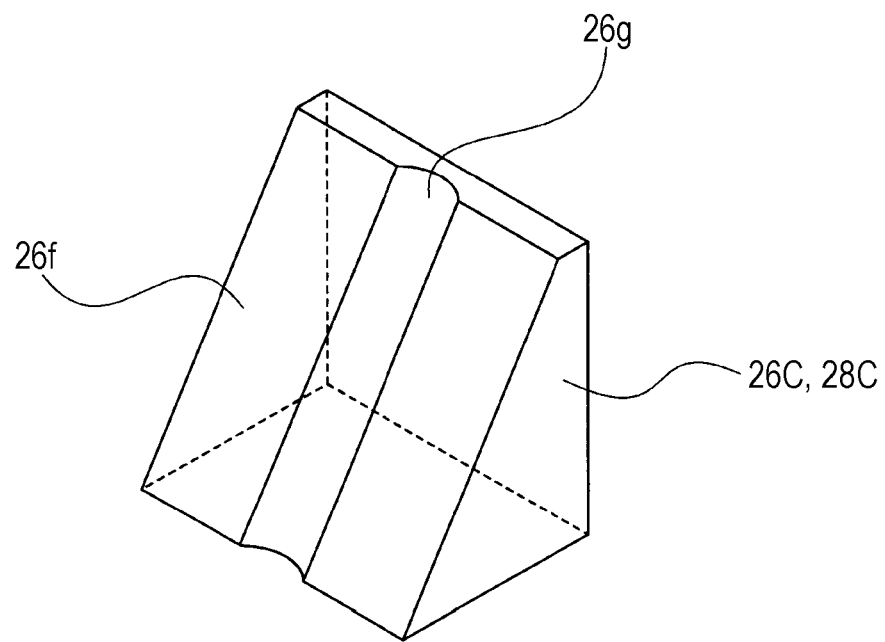
FIG. 38 is a schematic perspective view illustrating a fifth modified example together with FIGS. 39 to 41.
Figure 39:
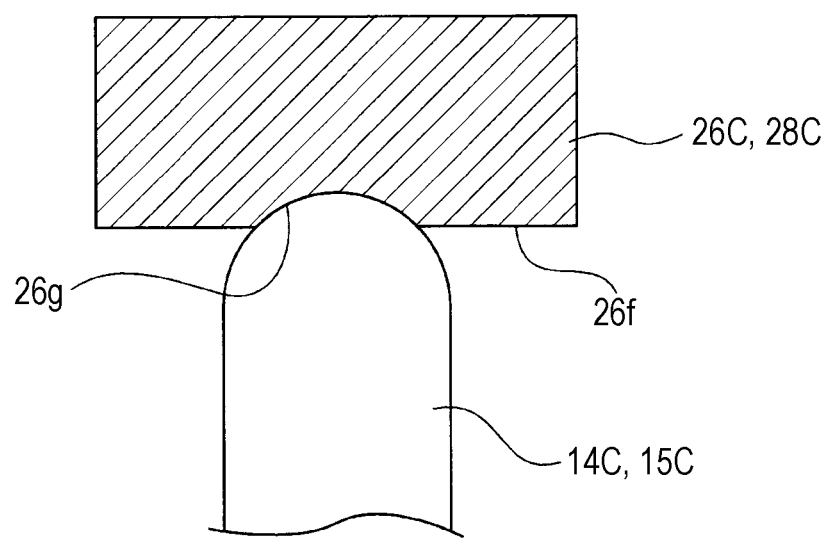
FIG. 39 is a schematic top plan view illustrating a condition where the lens unit is at a reference position before being rotated.

The first driving portion 26C has an inclined surface 26f which faces the diagonal upper front side, and a first operating surface 26g, which is formed as an arc surface and has a groove shape, is formed on the central portion of the inclined surface 26f in the horizontal direction (refer to FIG. 38).

The tip portion of the first driven portion 14C has a spherical shape, and a radius of curvature thereof is set to be equal to a radius of curvature of the first operating surface 26g. The size of the portion, which is formed in a hemispherical shape, in the first driven portion 14C is set to be larger than a depth of the first operating surface 26g.

Figure 40:
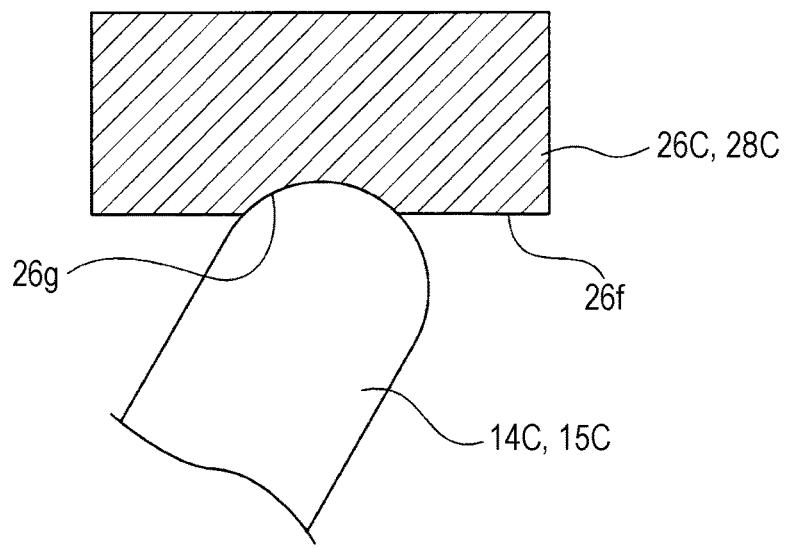
FIG. 40 is a schematic top plan view illustrating a condition where the lens unit is rotated.
Figure 41:
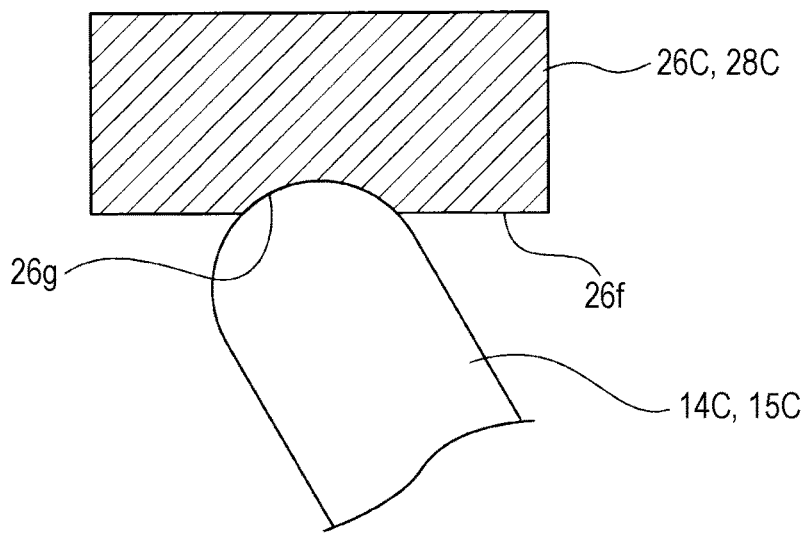
FIG. 41 is a schematic top plan view illustrating a different condition where the lens unit is rotated.

In a state where the first operating surface 26g of the first driving portion 26C comes into contact with the first driven portion 14C (refer to FIG. 39), when the lens unit 11 or 11A is rotated in the second direction and the third direction, an angle of the first driven portion 14C to the first operating surface 26g is changed (refer to FIGS. 40 and 41). In this case, the first operating surface 26g is formed in a spherical shape, and the tip portion of the first driven portion 14C is formed in a hemispherical shape which has a radius of curvature the same as the first operating surface 26g. Hence, the position on the first driven portion 14C coming into contact with the first operating surface 26g is kept at the same position.

Accordingly, when the lens unit 11 or 11A is rotated in a predetermined direction, there is no positional deviation in other directions, and it is possible to improve the accuracy in correction of the blur correction operation.

Sixth Modified Example

Figure 42:
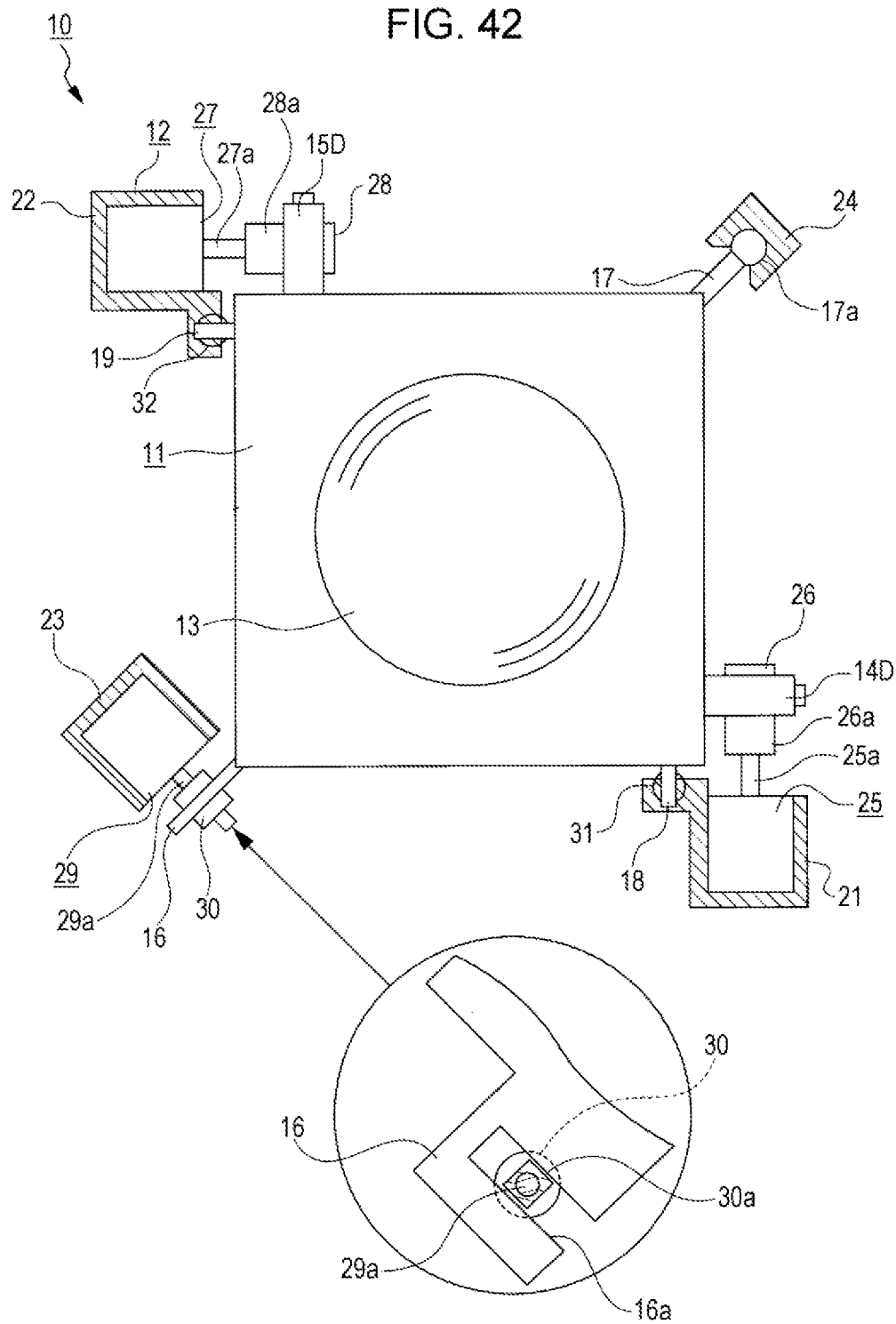
FIG. 42 is a schematic front view illustrating a sixth modified example together with FIG. 43.
Figure 43:
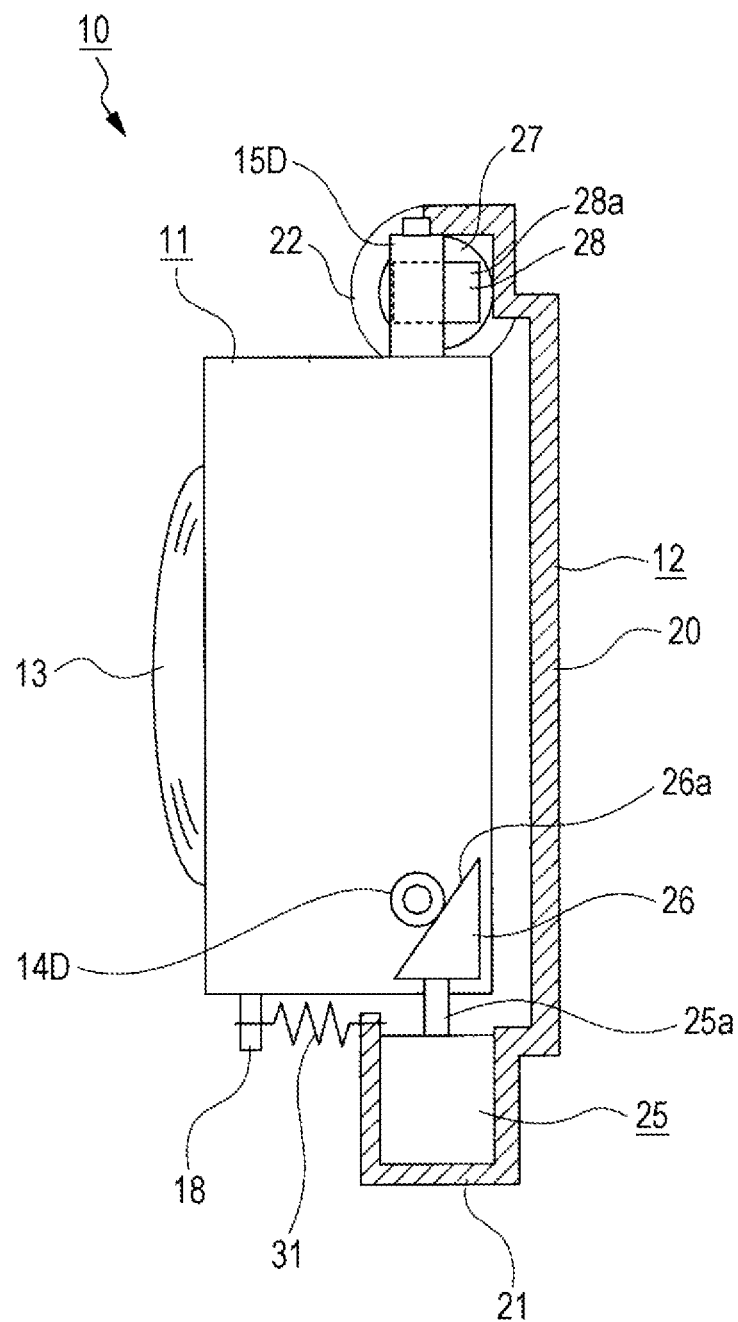
FIG. 43 is a schematic side view.

The sixth modified example describes a first driven portion 14D and a second driven portion 15D as modified examples of the first driven portion 14 and the second driven portion 15 (refer to FIGS. 42 and 43). Since the configurations and the operations of the first driven portion 14D and the second driven portion 15D are the same, the first driven portion 14D as an example will be hereinafter described.

The first driven portion 14D is formed in a cylindrical shape so as to be rotatable in the axial rotation direction, and functions as a rotatable roller. The outer peripheral surface of the first driven portion 14D is in contact with the first driving portion 26. Thus, the first driven portion 14D is rotated when the first driving portion 26 is moved.

Accordingly, when the first driven portion 14D is used, the load caused by the contact of the first driving portion 26 with the first driven portion 14D at the time of rotation of the lens unit 11 or 11A is small, and it is possible to secure a smooth rotation operation of the lens unit 11 or 11A.

In addition, the first driven portion 14D and the second driven portion 15D can be used not only in the case of respectively using the first driving portion 26 and the second driving portion 28, but also in the case of using the first driving portions 26A, 28A, 26B, 28B, and 36 according to the first modified example, the second modified example, and the fourth modified example.

Another Example

Figure 44:
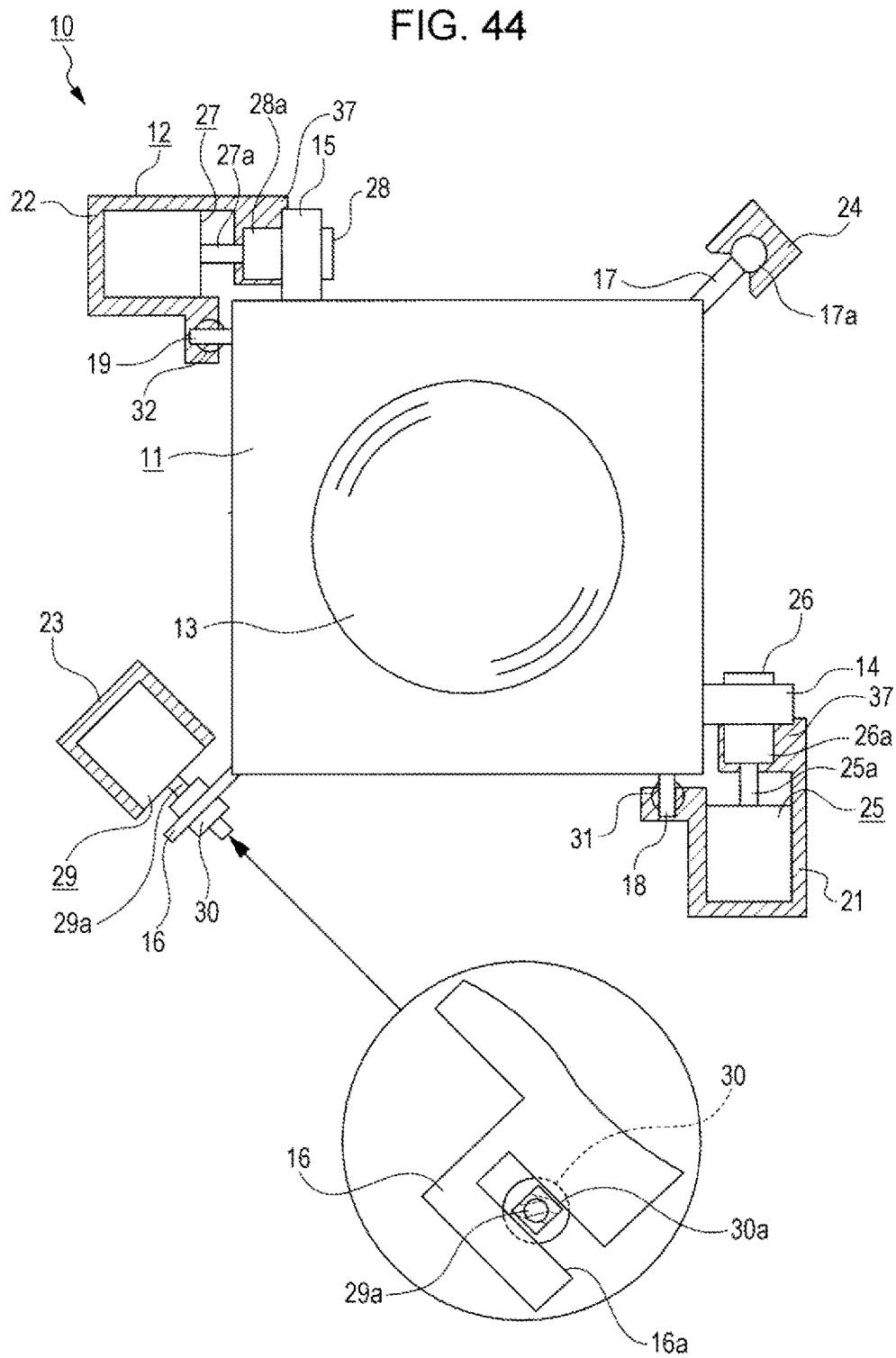
FIG. 44 is a schematic front view illustrating an example in which a rotatable-shaft-type actuator is used as the actuator together with FIG. 45.
Figure 45:
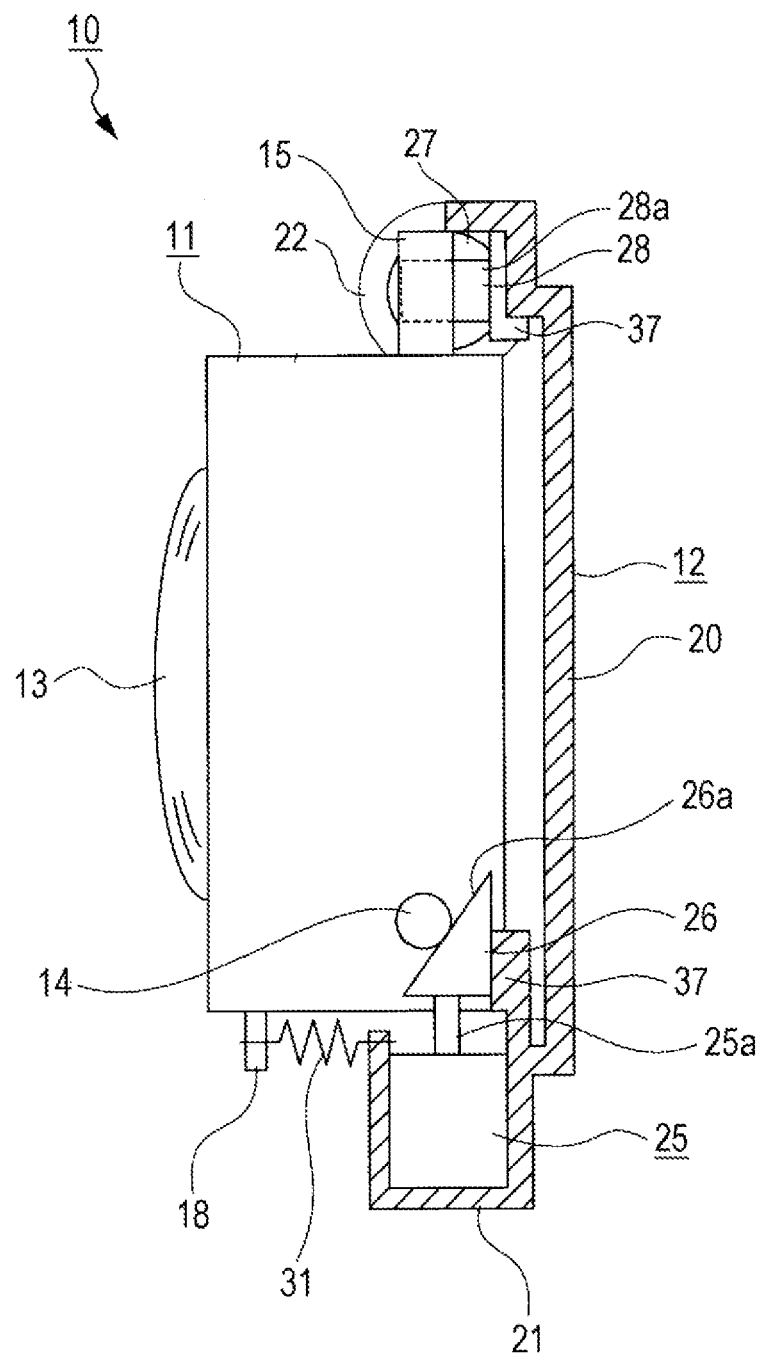
FIG. 45 is a schematic side view.

In the above described examples, the first actuator 25 and the second actuator 27 are movable-shaft-type actuators in which the first driving shaft 25a and the second driving shaft 27a are movable in the shaft direction. However, as described later, the first actuator 25 and the second actuator 27 (including the first actuators 25A, 25B, and the like) may be rotatable-shaft-type actuators in which the first driving shaft 25a and the second driving shaft 27a are rotated in the shaft rotation direction (refer to FIGS. 44 and 45).

In the case where the first actuator 25 and the second actuator 27 are the rotatable-shaft-type actuators, the configurations and the operations of both of them are the same, and thus an exemplary case of the first actuator 25 will be hereinafter described.

When the first actuator 25 is used as the rotatable-shaft-type actuator, thread grooves are formed in the driving shaft 25a, and thus the first driving portion 26 is threadedly engaged with the driving shaft 25a. For example, the first driving portion 26 comes into surface contact with a rotation regulation portion 37 which is provided in the fixing member 12, whereby the rotation is regulated.

Accordingly, when the driving shaft 25a of the first actuator 25 is rotated, the first driving portion 26, of which rotation is regulated by the rotation regulation portion 37, is pushed in a direction according to the rotation direction of the driving shaft 25a, and is moved upward or downward. When the first driving portion 26 is moved, the position of contact between the first driving portion 26 and the first driven portion 14 is changed, and the lens unit 11 is rotated.

Further, in the third actuator 29, the outer shape of the sliding engagement portion 30a of the driving portion 30 is formed in a rectangular shape so as not to rotate relative to the third driven portion 16. Thereby, as the third actuator 29, the rotatable-shaft-type actuator can also be used.

Others

In the above described example, by using the image blur correction device 10 according to the first embodiment and the image blur correction device 10A according to the second embodiment, the lens unit 11 or 11A is rotatable in three directions of the first, second, and third directions.

However, in the image blur correction device according to the first embodiment and the image blur correction device according to the second embodiment, the lens unit may be configured to be rotatable in any two directions of the first, second, and third directions.

Embodiment of Imaging Apparatus

FIG. 46 is a block diagram of a mobile phone as an imaging apparatus according to an embodiment of the present technology.

An imaging apparatus (mobile phone) 100 (corresponds to an imaging apparatus 1) includes: a lens unit 101 (corresponds to lens unit 11 or 11A) that is in charge of an imaging function; a camera signal processing section 102 that performs signal processing such as analog-digital conversion on a photographed image signal; and an image processing section 103 that performs recording reproduction processing on an image signal. Further, the imaging apparatus 100 includes: an image display section 104 such as a liquid crystal panel that displays the photographed image and the like; a reader/writer (R/W) 105 that writes and reads the image signal into and from a memory card 1000; a central processing unit (CPU) 106 that controls the entire imaging apparatus 100; an input section 107 that is formed of various switches and the like for causing a user to perform necessary operations; and a lens driving control section 108 that controls driving of the lens disposed in the lens unit 101.

The lens unit 101 includes: an optical system that includes a lens group 109; an imaging device 110 such as a charge coupled device (CCD) or a complementary metal-oxide semiconductor (CMOS); and the like.

The camera signal processing section 102 performs various kinds of signal processing such as conversion of an output signal from the imaging device 110 into a digital signal, noise removal, image quality correction, and conversion into a luminance color difference signal.

The image processing section 103 performs compression coding and expansion decoding processing on the image signal based on a predetermined image data format, processing of converting a data specification such as resolution, and the like.

The image display section 104 has a function of displaying a state of a user's operation performed on the input section 107 and various kinds of data such as the photographed image.

The R/W 105 writes the image data, which is encoded by the image processing section 103, into the memory card 1000, and reads the image data which is recorded in the memory card 1000.

The CPU 106 functions as a control processing unit that controls respective circuit blocks provided in the imaging apparatus 100, and controls the respective circuit blocks on the basis of an instruction input signal from the input section 107 and the like.

The input section 107 includes, for example, a shutter release button for performing a shutter operation and a selection switch for selecting an operation mode, and outputs the instruction input signal according to the user's operation to the CPU 106.

The lens driving control section 108 controls a not-shown motor that drives the lenses of the lens group 109 on the basis of the control signal sent from the CPU 106.

The memory card 1000 is, for example, a semiconductor memory that is detachable from a slot connected to the R/W 105.

Hereinafter, the operations of the imaging apparatus 100 will be described.

In a photography standby state, under the control performed by the CPU 106, the signal of the image photographed by lens unit 101 is output to the image display section 104 through the camera signal processing section 102, and is displayed as a camera live view. Further, when the instruction input signal for zooming sent from the input section 107 is input, the CPU 106 outputs the control signal to the lens driving control section 108, and thereby a predetermined lens of the lens group 109 is moved on the basis of the control of the lens driving control section 108.

When a not-shown shutter of the lens unit 101 is operated by the instruction input signal sent from the input section 107, the photographed image signal is output from the camera signal processing section 102 to the image processing section 103, and is subjected to the compression coding processing so as to be converted into digital data with a predetermined data format. The converted data is output to the R/W 105, and is written into the memory card 1000.

Focusing and zooming are performed by causing the lens driving control section 108 to move the predetermined lens of the lens group 109 on the basis of the control signal sent from the CPU 106.

When the image data recorded in the memory card 1000 is reproduced, in response to the operation of the input section 107, predetermined image data is read from the memory card 1000 through the R/W 105, and is subjected to the expansion decoding processing through the image processing section 103. Thereafter, the reproduced image signal is output to the image display section 104, and a reproduced image is displayed.

CONCLUSION

As described above, in the image blur correction device 10 or 10A, the fulcrum portion 17 or 34 as the rotation fulcrum of the lens unit 11 or 11A in the first direction and second direction is provided. In addition, at least one of the respective axes of the first fulcrum axis S1 and the second fulcrum axis S2 is positioned on either one of the respective lines of: the line connecting the fulcrum portion 17 or 34 and the second driving portion 28, 28A, 28B, or 28C; and the line connecting the fulcrum portion 17 or 34 and the first driving portion 26, 26A, 26B, or 26C.

Accordingly, the lens unit 11 or 11A is rotatable in the axial rotation direction of the first fulcrum axis S1 or the second fulcrum axis S2 which is positioned on the line connecting the fulcrum portion 17 or 34 and the second driving portion 28, 28A, 28B, or 28C or the line connecting the fulcrum portion 17 or 34 and the first driving portion 26, 26A, 26B, or 26C. Hence, it is possible to simplify the structure and achieve reduction in the size of the device.

PRESENT TECHNOLOGY

The present technology may have the following configurations:

(1) An image blur correction device including:
a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis;
a fixing member that rotatably supports the lens unit in the first and second directions;
a first actuator that has a first driving portion so as to rotate the lens unit in the first direction; and
a second actuator that has a second driving portion so as to rotate the lens unit in the second direction,
in which a fulcrum portion is provided as a point of support on the fixing member of the lens unit, and
in which at least one of the first fulcrum axis and the second fulcrum axis is positioned on either one of lines connecting the fulcrum portion to the driving portions.

(2) The image blur correction device according to (1), in which the first fulcrum axis and the second fulcrum axis are respectively positioned on the lines connecting the fulcrum portion to the driving portions.

(3) The image blur correction device according to (2), in which the first fulcrum axis and the second fulcrum axis are positioned to be coplanar.

(4) The image blur correction device according to (2) or (3), in which the lens unit is rotatable in a third direction which is an axial rotation direction of a third fulcrum axis orthogonal to both of the first fulcrum axis and the second fulcrum axis relative to the fixing member, and in which a third actuator, which has a third driving portion so as to rotate the lens unit in the third direction, is provided.

(5) The image blur correction device according to any one of (1) to (4), in which the fulcrum portion is positioned on the optical axis.

(6) The image blur correction device according to any one of (1) to (5), in which the driving portion is movable in an axial direction of the fulcrum axis, in which an operating surface, which is oblique to the fulcrum axis, is formed on the driving portion, in which a driven portion, of which the operating surface is slidable at the time of movement of the driving portion, is provided in the lens unit, and in which the lens unit is rotated by changing a position on the operating surface coming into contact with the driven portion.

(7) The image blur correction device according to (6), in which the operating surface is formed in a planar shape.

(8) The image blur correction device according to (6), in which the operating surface is formed in a curved shape convex toward the driven portion.

(9) The image blur correction device according to (6), in which the operating surface is formed of two planar portions which are oblique, and in which an intersection line portion between the two planar portions is slidable on the driven portion.

(10) The image blur correction device according to any one of (6) to (9), in which a bias spring for urging the lens unit in a direction, in which the driven portion is pressed against the operating surface, is provided.

(11) The image blur correction device according to any one of (6) to (10), in which a rotatable roller is provided as the driven portion, and in which the driven portion is rotated when the operating surface slides on the driven portion.

(12) An imaging apparatus including:

an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis, in which the image blur correction device includes a fixing member that rotatably supports the lens unit in the first and second directions, a first actuator that has a first driving portion so as to rotate the lens unit in the first direction, and a second actuator that has a second driving portion so as to rotate the lens unit in the second direction, in which a fulcrum portion is provided as a point of support on the fixing member of the lens unit, and in which at least one of the first fulcrum axis and the second fulcrum axis is positioned on either one of a line connecting the fulcrum portion to the first driving portion or a line connecting the fulcrum portion to the second driving portion.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device, comprising:
    a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis;
    a fixing member configured to rotatably supports the lens unit in the first and second directions;
    a first actuator that has a first driving portion configured to rotate the lens unit in the first direction; and
    a second actuator that has a second driving portion configured to rotate the lens unit in the second direction,
    wherein a fulcrum portion is provided as a point of support on the fixing member of the lens unit,
    wherein the first fulcrum axis is positioned on a line connecting the fulcrum portion to one of the first driving portion and the second driving portion, and
    wherein the second fulcrum axis is positioned on a line connecting the fulcrum portion to another of the first driving portion and the second driving portion.

2. The image blur correction device according to claim 1, wherein the first fulcrum axis and the second fulcrum axis are positioned to be coplanar.

3. The image blur correction device according to claim 1, wherein the lens unit is configured to rotate in a third direction which is an axial rotation direction of a third fulcrum axis orthogonal to both of the first fulcrum axis and the second fulcrum axis relative to the fixing member, and
    wherein a third actuator, which has a third driving portion configured to rotate the lens unit in the third direction, is provided.

4. The image blur correction device according to claim 1, wherein the fulcrum portion is positioned on the optical axis.

5. The image blur correction device according to claim 1,
    wherein each of the first and second driving portion is configured to move in an axial direction of the corresponding fulcrum axis,
    wherein an operating surface, which is oblique to the corresponding fulcrum axis, is formed on each of the first and second driving portion,
    wherein a driven portion, on which the operating surface is slidable at the time of movement of the driving portion of the first and second driving portion, is provided in the lens unit, and
    wherein the lens unit is rotated by changing a position on the operating surface coming into contact with the driven portion.

6. The image blur correction device according to claim 5, wherein the operating surface is formed in a planar shape.

7. The image blur correction device according to claim 5, wherein the operating surface is formed in a curved shape convex toward the driven portion.

8. The image blur correction device according to claim 5, wherein the operating surface is formed of two planar portions which are oblique, and wherein an intersection line portion between the two planar portions is slidable on the driven portion.

9. The image blur correction device according to claim 5, wherein a bias spring configured to urge the lens unit in one of the first direction or the second direction, in which the driven portion is pressed against the operating surface, is provided.

10. The image blur correction device according to claim 5, wherein a rotatable roller is provided as the driven portion, and wherein the driven portion is configured to rotate in an event the operating surface slides on the driven portion.

11. An imaging apparatus, comprising:
an image blur correction device that has a lens unit having at least one lens and an outer casing, in which the lens unit is disposed, and is configured to correct image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis,
wherein the image blur correction device comprises:
a fixing member configured to rotatably support the lens unit in the first and second directions,
a first actuator that has a first driving portion configured to rotate the lens unit in the first direction, and
a second actuator that has a second driving portion configured to rotate the lens unit in the second direction,
wherein a fulcrum portion is provided as a point of support on the fixing member of the lens unit,
wherein the first fulcrum axis is positioned on a line connecting the fulcrum portion to one of the first driving portion and second driving portion, and wherein the second fulcrum axis is positioned on a line connecting the fulcrum portion to another of the first driving portion and the second driving portion.

* * * * *